United States Patent
Davis et al.

(10) Patent No.: US 11,171,779 B2
(45) Date of Patent: Nov. 9, 2021

(54) METHODS AND APPARATUS FOR ENCRYPTING, STORING, AND/OR SHARING SENSITIVE DATA

(71) Applicant: Airside Mobile, Inc., Arlington, VA (US)

(72) Inventors: Peter Davis, Ashburn, VA (US); Florian Scholochow, Innsbruck (AT); Florian Häser, Volders (AT)

(73) Assignee: Airside Mobile, Inc., Arlington, VA (US)

( * ) Notice: Subject to any disclaimer, the term of this patent is extended or adjusted under 35 U.S.C. 154(b) by 244 days.

(21) Appl. No.: 16/685,180

(22) Filed: Nov. 15, 2019

(65) Prior Publication Data

US 2020/0162252 A1 May 21, 2020

Related U.S. Application Data

(60) Provisional application No. 62/767,906, filed on Nov. 15, 2018.

(51) Int. Cl.
*H04L 9/14* (2006.01)
*H04L 9/08* (2006.01)
(Continued)

(52) U.S. Cl.
CPC .............. *H04L 9/14* (2013.01); *G06F 21/105* (2013.01); *H04L 9/0825* (2013.01); *H04L 9/0872* (2013.01); *H04L 9/3247* (2013.01)

(58) Field of Classification Search
CPC ....... H04L 9/14; H04L 9/0872; H04L 9/3247; H04L 9/0825; H04L 9/088; G06F 21/105;
(Continued)

(56) References Cited

U.S. PATENT DOCUMENTS

| 7,840,487 B2 | 11/2010 | Hatano et al. |
| 8,175,269 B2 | 5/2012 | Pilipchuk |

(Continued)

OTHER PUBLICATIONS

Roselin et al., "Secure Sensitive Data Sharing on Big Data Platform", Mar. 2018, International Journal of Innovative Research in Advanced Engineering (IJIRAE), Issue 03, vol. 5, pp. 103-106. (Year: 2018).*

(Continued)

*Primary Examiner* — Matthew Smithers
(74) *Attorney, Agent, or Firm* — Cooley LLP

(57) ABSTRACT

A method includes receiving, at a server and from a sharing entity, data encrypted using a first encryption key associated with the sharing entity. The server receives from the sharing entity a copy of the first encryption key encrypted using a second encryption key different from the first encrypted key and associated with the relying entity. The server receives from the sharing entity a license that includes data defining at least one rule associated with the relying entity accessing the data stored on the server. The server sends to the relying entity the copy of the first encryption key such that the relying entity can decrypt the copy of the first encryption key to access the data using the first encryption key, in accordance with the at least one rule. The server removes from memory the data in accordance with the at least one rule of the license.

22 Claims, 5 Drawing Sheets

(51) Int. Cl.
*G06F 21/10* (2013.01)
*H04L 9/32* (2006.01)

(58) Field of Classification Search
CPC ......... G06F 21/6218; G06F 2221/2137; G06F 2221/2115; G06F 2221/2107
See application file for complete search history.

(56) References Cited

U.S. PATENT DOCUMENTS

| | | |
|---|---|---|
| 8,769,270 B2 | 7/2014 | Orsini et al. |
| 8,863,298 B2 | 10/2014 | Akella et al. |
| 8,966,287 B2 | 2/2015 | Bogorad |
| 9,118,462 B2 | 8/2015 | Khambete |
| 9,537,918 B2 | 1/2017 | Chan et al. |
| 9,686,251 B2 | 6/2017 | Marinkkovic et al. |
| 9,996,698 B2 | 6/2018 | Breuer et al. |
| 10,027,484 B2 | 7/2018 | O'Hare et al. |
| 2007/0043667 A1 | 2/2007 | Qawami et al. |
| 2009/0034741 A1 | 2/2009 | Sabev |
| 2009/0208016 A1 | 8/2009 | Choi et al. |
| 2012/0214444 A1* | 8/2012 | McBride ............. H04W 12/068 455/411 |
| 2012/0331088 A1 | 12/2012 | O'Hare et al. |
| 2013/0246790 A1 | 9/2013 | Wang |
| 2015/0365385 A1* | 12/2015 | Hore ....................... H04L 63/06 713/152 |
| 2016/0105405 A1 | 4/2016 | Chew |
| 2017/0005797 A1* | 1/2017 | Lanc ....................... H04L 9/085 |
| 2017/0048245 A1 | 2/2017 | Owen et al. |
| 2017/0323114 A1 | 11/2017 | Egorov et al. |
| 2018/0048464 A1* | 2/2018 | Lim ....................... H04L 9/0822 |
| 2018/0262339 A1 | 9/2018 | Kazin et al. |
| 2018/0288021 A1 | 10/2018 | Basin |
| 2020/0012810 A1* | 1/2020 | Chavez ............... G06F 21/6245 |

OTHER PUBLICATIONS

Raj et al., "Efficient Mechanism for Sharing Private Data in a Secured Manner", 2016, International Conference on Circuit, Power and Computing Technologies [ICCPCT], pp. 1-4. (Year: 2016).*
International Search Report and Written Opinion dated Jan. 23, 2020, for International Application No. PCT/US2019/061762, 8 pages.
RFC 7515: JSON Web Signatures. Jones, Michael, et al. May 2015 https://tools.ietf.org/pdf/rfc7515.
RFC 7516: JSON Web Encryption. Jones, Michael, et al. May 2015 https://tools.ietf.org/pdf/rfc7516.
RFC 7517: JSON Web Key. Jones, Michael. May 2015 https://tools.ietf.org/pdf/rfc7517.

* cited by examiner

20

```
Receive, at a server or processor thereof, data from a sharing entity
that is (1) encrypted using a first encryption key associated with the
sharing entity and (2) digitally signed with a digital signature
generated using a second encryption key associated with the
sharing entity
21
```

↓

```
Verify, at the server or processor thereof, that the data was
received from the sharing entity based on the digital signature
22
```

↓

```
Receive, at the server or processor thereof and from the sharing
entity, a copy of the first encryption key encrypted using a third
encryption key associated with a relying entity
23
```

↓

```
Receive, at the server or processor thereof, a license from the
sharing entity that includes data that defines at least one rule
associated with the relying entity accessing the data using the first
encryption key
24
```

↓

```
Send, from the server or processor thereof and to the relying entity,
the copy of the first encryption key such that the relying entity can
decrypt the copy of the first encryption key to access the data in
accordance with the at least one rule
25
```

FIG. 7

METHODS AND APPARATUS FOR ENCRYPTING, STORING, AND/OR SHARING SENSITIVE DATA

CROSS-REFERENCE TO RELATED APPLICATIONS

This application claims priority to and the benefit of U.S. Provisional Patent Application Ser. No. 62/767,906 entitled, "Methods and Apparatus for Encrypting, Storing, and/or Sharing Sensitive Data," filed Nov. 15, 2018, the disclosure of which is incorporated herein by reference in its entirety.

BACKGROUND

The embodiments and methods described herein relate generally to encrypting, storing, and/or sharing data, and more particularly, to securely and efficiently storing sensitive data and securely sharing the sensitive data with a relying entity.

Modern increases in the capabilities of electronic devices have led to significant increases in the amount of digital information stored within those devices. In some instances, the subject matter of the stored information (data) can be publically available or publically accessible information. In other instances, however, the subject matter of the data can relate to a person's identity and/or can otherwise be personally sensitive, highly confidential, and/or the like. The need to securely store sensitive material and/or the need to securely share the sensitive material with desired parties continues to present challenges. In addition, challenges persist with how to control the mechanisms by which a party stores the sensitive material once shared and/or how to control the length of time the party is authorized to store the sensitive material.

As such, a need exists for methods and apparatus for secure and efficient storage and sharing of sensitive data with a relying entity.

SUMMARY

Methods and apparatus for securely and efficiently storing sensitive data and securely sharing the sensitive data with a relying entity are described herein. In some embodiments, a method includes receiving, at a server and from a sharing entity, data encrypted using a first encryption key associated with the sharing entity. The server receives from the sharing entity a copy of the first encryption key encrypted using a second encryption key different from the first encrypted key. The second encryption key is associated with the relying entity. The server receives from the sharing entity a license that includes data defining at least one rule associated with the relying entity accessing, using the first encryption key, the data stored on the server. The server sends to the relying entity the copy of the first encryption key such that the relying entity can decrypt the copy of the first encryption key to access, in accordance with the at least one rule, the data encrypted using the first encryption key that is stored on the server. The server removes the data encrypted using the first encryption key from a memory of the server in accordance with the at least one rule of the license.

BRIEF DESCRIPTION OF THE DRAWINGS

FIG. 7 is a flowchart illustrating a method of using a system for securely and efficiently storing and sharing sensitive data with a relying entity, according to an embodiment.

DETAILED DESCRIPTION

Figure 1:
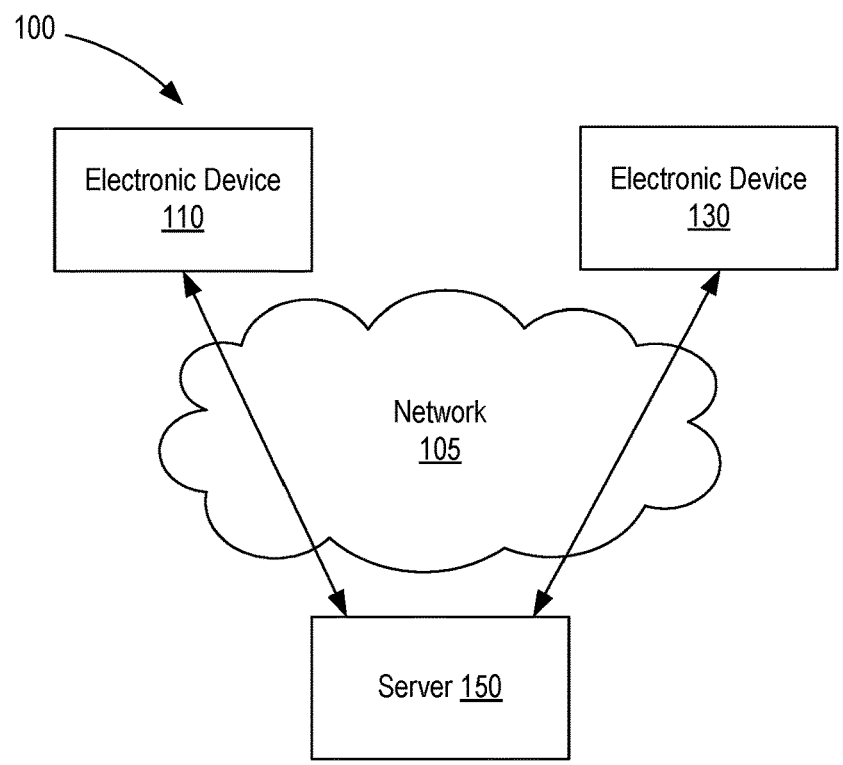
FIG. 1 is a schematic illustration of a system for securely and efficiently storing and sharing sensitive data with a relying entity, according to an embodiment.

The embodiments and/or implementations described herein include and/or are executed as an information storage and sharing platform with increased user privacy and/or security relative to at least some known storage and/or sharing systems or platforms. In general, the systems and methods described herein implement multiple layers of encryption to protect the contents of a document or other data that a user (also referred to as a "sharing entity") desires to share with at least one third party (also referred to as "relying entity"). As described in further detail herein, the user or an electronic device controlled by the user can encrypt data that he or she intends to share with at least one third party and can send the encrypted data to a server configured to at least temporarily store the encrypted data without having access to the contents of the encrypted data (e.g., the server is not granted a corresponding encryption key and thus, cannot decrypt the encrypted data). The user defines and controls a scope of consent granted to the one or more third parties associated with accessing his or her encrypted data stored on the server and defines and/or controls a time during which the one or more third parties may access the encrypted data (e.g., an "access time"). In some implementations, the server is configured to delete the encrypted data from a memory of the server upon expiration of the access time.

In some embodiments, a method for secure and efficient storage of data and selective sharing of the data with a relying entity includes receiving, at a server and from a sharing entity, data encrypted using a first encryption key associated with the sharing entity. The server receives from the sharing entity a copy of the first encryption key encrypted using a second encryption key different from the first encrypted key. The second encryption key is associated with the relying entity. The server receives from the sharing entity a license that includes data defining at least one rule associated with the relying entity accessing, using the first encryption key, the data stored on the server. The server sends to the relying entity the copy of the first encryption key such that the relying entity can decrypt the copy of the first encryption key to access, in accordance with the at least one rule, the data encrypted using the first encryption key that is stored on the server. The server removes the data encrypted using the first encryption key from a memory of the server in accordance with the at least one rule of the license.

In some embodiments, a non-transitory processor readable medium storing code representing instructions to be executed by a processor can include code to cause the processor to receive data from a sharing entity. The data is encrypted using a first encryption key associated with the sharing entity. The data is signed with a digital signature generated using a second encryption key associated with the sharing entity different from the first encryption key, allowing the processor to verify the data was received from the sharing. The code can cause the processor to receive from the sharing entity a copy of the first encryption key that is encrypted using a third encryption key different from the first encryption key and the second encryption key. The third encryption key is associated with a relying entity. The code can cause the processor to receive from the sharing entity a license that includes data defining at least one rule associated with the relying entity accessing the data using the first encryption key. The code can cause the processor to send to the relying entity the copy of the first encryption key such that the relying entity can decrypt the copy of the first encryption key to access the data in accordance with the at least one rule.

In some embodiments, an apparatus includes a memory and a processor operatively coupled to the memory. The processor is configured to store in the memory a message received from a sharing entity. The message includes (1) data encrypted using a first encryption key associated with the sharing entity, (2) a copy of the first encryption key encrypted using a second encryption key different from the first encryption key and associated with a relying entity, and (3) a license including data indicative of at least one rule associated with the sharing entity consenting to the relying entity using the first encryption key to access the data. The message is signed by the sharing entity using a digital signature generated via a third encryption key that is different from the first encryption key and the second encryption key, which allows the processor to verify the message was received from the sharing entity. The processor is configured to send to the relying entity the copy of the first encryption key such that the relying entity is allowed to access the data stored in the memory using the first encryption key and in accordance with the at least one rule.

As used in this specification, the singular forms "a," "an," and "the" include plural referents unless the context clearly dictates otherwise. Thus, for example, the term "a processor" is intended to mean a single processor or a combination of processors, "a network" is intended to mean one or more networks, or a combination thereof.

As used herein, "encryption" generally refers to the process of transforming digital information (also referred to as "plaintext") into encoded digital information (also referred to as "ciphertext"), which is intended to be decoded only by a party authorized to access the plaintext. The encoding and decoding can be performed using one or more encryption keys, which are used and/or generated according to an encryption scheme used when encrypting data. For example, a symmetric-key encryption scheme uses the same encryption key to perform the encryption (e.g., encoding) and decryption (e.g., decoding). Accordingly, a sharing entity and a relying entity have copies of the same key (referred to herein as a "symmetric encryption key" or "symmetric key"), which can be sent with or independent of the encrypted message and/or encrypted data.

Alternatively, an asymmetric-key encryption scheme uses a first encryption key to perform the encryption and a second encryption key different from the first encryption key to perform the decryption. In general, each party or an electronic device controlled by each party includes and/or generates a private encryption key (also referred to herein as "private key") and a public encryption key (also referred to herein as "public key"). The public key is published and openly accessible to other electronic devices. The private key is not published and is generally maintained in private or secret. As such, the asymmetric-key encryption scheme can be implemented by encrypting data (e.g., plaintext) using the public key of a relying entity (e.g., the party or entity intended to receive the encrypted data) and decrypting the encrypted data using the private key of that relying entity. While the public key of the relying entity is used to encrypt the data, it cannot be used to decrypt the data. As described in further detail herein, the systems and/or methods described herein can implement both a symmetric-key encryption scheme and an asymmetric-key encryption scheme.

While encryption keys are described above as encrypting data to secure, hide, or obfuscate the plaintext (e.g., the unencrypted data), encryption keys also can be used to verify the authenticity of data being shared. For example, in some instances, a private key of the sharing entity can be used to digitally sign a message (e.g., encrypted data) being sent to a relying entity. In such instances, the relying entity can verify the digital signature using the public key of the sharing entity. Accordingly, unless the secrecy of the sharing entity's private key has been compromised, the verification of the digital signature using the sharing entity's public key ensures that the message (e.g., encrypted data) was digitally signed (or sent) by the sharing entity.

In some embodiments and/or implementations, data being shared can be digitally signed by more than one party and/or entity. For example, in some instances, a first entity (e.g., a sharing entity) may decide and/or wish to share sensitive data (e.g., personally identifying information) with a relying entity. In such instances, a second entity (e.g., a data validating or data issuing entity such as, for example, a government agency, regulatory entity, and/or the like) can digitally sign the sensitive data to attest to the validity, truth, and/or conformance of the sensitive data. In some instances, the second entity (e.g., a human associated with the second entity or an electronic device(s) associated with the second entity) can perform a physical analysis and/or verification of a source of data (e.g., personally identifying data such as a driver's license, passport, identification card, etc.), which can be used to corroborate the authenticity, validity, accuracy or truth of a digital representation of at least a portion of the identifying data. In some instances, when the second entity verifies the authenticity, validity, accuracy or truth of the data or the source of data, the second entity can verify the digital representation of the data by providing a digital signature. As such, the second entity can verify that the information in the document is fact and can reassert that the information is fact by way of providing its digital signature. In some implementations, a system can be configured such that the verification by one or more third party entities is performed automatically. In other implementations, the verification by one or more third party entities can be in response to a request for verification by a sharing entity, a relying entity, and/or a server or host device of the system.

In addition, prior to sharing the sensitive data, the first entity can encrypt the sensitive data and can digitally sign the encrypted data to authenticate and/or verify that the encrypted data was sent from the first entity (e.g., the sharing entity), as described in further detail herein. In some instances, the encrypted data can be an aggregation and/or combination of sensitive data from multiple sources (e.g., issuing entities). As such, each validating and/or issuing entity can digitally sign a corresponding portion of the sensitive data and the first entity can then encrypt the aggregated and/or combined data and can digitally sign the encrypted data, as described in further detail herein. In other words, the validating and/or issuing entity(ies) can digitally sign one or more portions of the sensitive data prior to the first or sharing entity encrypting the aggregated and/or combined data. In some instances, such an implementation can enhance the security of the encrypted data by not allowing an entity to see or verify the digital signature(s) without first decrypting the encrypted aggregated and/or combined data. In contrast, the first or sharing entity can be configured to digitally sign the encrypted data—in other words, the first or sharing entity can provide a digital signature after encrypting data. In some instances, such an implementation can allow a server or relying entity to verify that the encrypted data is, in fact, received from the first or sharing entity, as described in further detail herein.

Referring now to FIG. 1, a schematic illustration of a system 100 for securely and efficiently storing sensitive data and securely sharing the sensitive data with a relying entity is shown according to an embodiment. The system 100 includes at least a first electronic device 110, a second electronic device 130, and a server 150, which are in communication via a network 105. As described in further detail herein, in some implementations, the system 100 can allow the first electronic device 110 to send encrypted data to the server 150, which in turn, can store the encrypted data for a predetermined time. The electronic device 110 can further send to the server 150 instructions and/or rules associated with and/or otherwise governing access to the encrypted data by, for example, the second electronic device 130.

The network 105 can be any type of network(s) such as, for example, a local area network (LAN), a wireless local area network (WLAN), a virtual network such as a virtual local area network (VLAN), a wide area network (WAN), a metropolitan area network (MAN), a worldwide interoperability for microwave access network (WiMAX), a telephone network (such as the Public Switched Telephone Network (PSTN) and/or a Public Land Mobile Network (PLMN)), an intranet, the Internet, an optical fiber (or fiber optic)-based network, a cellular network, and/or any other suitable network. Moreover, the network 105 can be implemented as a wired and/or wireless network. In some implementations, the network 105 can include one or more networks of any type such as, for example, a wired or wireless LAN and the Internet.

The first electronic device 110 can be any suitable hardware-based computing device. For example, in some embodiments, the first electronic device 110 can be, for example, a smartphone, a tablet, a laptop, a personal computer (PC), a wearable electronic device, a server device, a workstation, and/or the like. In some implementations, the first electronic device 110 is a device owned and/or controlled by a first entity. In some instances, the first entity may desire to share with a third party data owned, controlled, and/or associated with the first entity (e.g., personal or sensitive data owned by, about, and/or associated with the first entity). In such instances, the first entity (also referred to herein as "sharing entity") can manipulate the first electronic device 110 such that the first electronic device 110 encrypts the data that the sharing entity wishes to share and defines a set of rules governing access to the encrypted data by a third party (also referred to herein as "relying entity").

Figure 2:
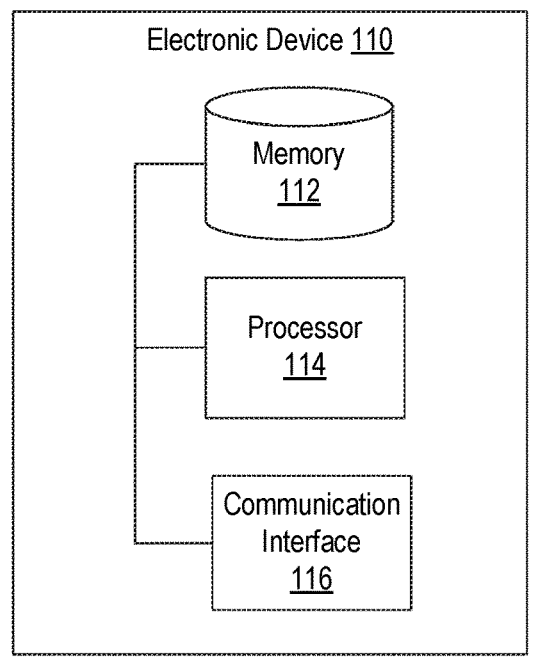
FIGS. 2 and 3 are schematic illustrations of an electronic device and a server, respectively, included in the system of FIG. 1.

As shown in FIG. 2, the first electronic device 110 can include at least a memory 112, a processor 114, and a communication interface 116. The memory 112 of the first electronic device 110 can be, for example, a random access memory (RAM), a memory buffer, a hard drive, a read-only memory (ROM), an erasable programmable read-only memory (EPROM), a flash memory, and/or the like. The memory 112 can be configured to store, for example, one or more software modules and/or code that can include instructions that can cause the processor 114 to perform one or more processes, functions, and/or the like (e.g., processes, functions, etc. associated with encrypting data and/or defining one or more rules governing access to the encrypted data).

The processor 114 can be a hardware-based integrated circuit (IC) and/or any other suitable processing device configured to run or execute a set of instructions and/or code stored, for example, in the memory 112. For example, the processor 114 can be a general purpose processor, a central processing unit (CPU), an accelerated processing unit (APU), an application specific integrated circuit (ASIC), a network processor, a front end processor, a field programmable gate array (FPGA), a programmable logic array (PLA), and/or the like. The processor 114 can be in communication with the memory 112 via any suitable interconnection, system bus, circuit, and/or the like. As described in further detail herein, the processor 114 can include any number of engines, processing units, cores, etc. configured to execute code, instructions, modules, processes, and/or functions associated with encrypting data and defining one or more rules governing access to the encrypted data.

The communication interface 116 can be any suitable hardware-based device in communication with the processor 114 and the memory 112 and/or any suitable software stored in the memory 112 and executed by the processor 114. In some implementations, the communication interface 116 can be configured to communicate with the network 105 (e.g., any suitable device in communication with the network 105). The communication interface 116 can include one or more wired and/or wireless interfaces, such as, for example, a network interface card (NIC). In some implementations, the NIC can include, for example, one or more Ethernet interfaces, optical carrier (OC) interfaces, and/or asynchronous transfer mode (ATM) interfaces, one or more wireless radios (e.g., a WiFi® radio, a Bluetooth® radio, etc.), and/or the like. As described in further detail herein, in some implementations, the communication interface 116 can be configured to send data to and/or receive data from (e.g., encrypted data) the server 150 and/or the second electronic device 130.

Although not shown in FIGS. 1 and 2, the first electronic device 110 can also include and/or can be in communication with any suitable user interface. For example, in some embodiments, a user interface of the first electronic device 110 can be a display such as, for example, a cathode ray tube (CRT) monitor, a liquid crystal display (LCD) monitor, a light emitting diode (LED) monitor, and/or the like. In some instances, the display can be a touch sensitive display or the like (e.g., the touch sensitive display of a smartphone, tablet, wearable device, and/or the like). In some instances, the display can provide the user interface for a software application (e.g., a mobile application, internet web browser, and/or the like) that can allow the user to manipulate the first electronic device 110. In other implementations, the user interface can be any other suitable user interface such as a mouse, keyboard, display, and/or the like.

In some implementations, the second electronic device 130 can be substantially similar to the first electronic device 110. For example, the second electronic device 130 can be any suitable hardware-based computing device such as, for example, a smartphone, a tablet, a laptop, a PC, a wearable electronic device, a server device, a workstation, and/or the like. As described above with reference to the first electronic device 110, the second electronic device 130 can include at least a memory, a processor, a communication interface, and a user interface (not shown). In some embodiments, the user interface can be a display that can provide at least a portion of a user interface for a software application (e.g., a mobile application, a PC application, an internet web browser, etc.) installed on the second electronic device 130. In other implementations, the user interface can be any other suitable user interface such as a mouse, keyboard, display, and/or the like. The network interface can be, for example, a network interface card and/or the like that can include at least an Ethernet port and/or a wireless radio (e.g., a WiFi® radio, a Bluetooth® radio, etc.). The memory can be and/or can include, for example, a RAM, a memory buffer, a hard drive, a ROM, an EPROM, a flash memory, and/or the like. The processor can be any suitable processing device configured to run or execute a set of instructions or code. For example, the processor can be a general purpose processor, a CPU, an APU, an ASIC, and/or the like. The processor can be configured to run or execute a set of instructions or code stored in the memory associated with using, for example, a personal computer (PC) application, a mobile application, an internet web browser, a cellular and/or wireless communication (via a network), and/or the like, as described in further detail herein.

In some implementations, the second electronic device 130 is a device owned and/or controlled by a second entity (e.g., a relying entity). The second entity can be any suitable entity with whom the sharing entity intends to share data. For example, the relying entity can be an entity that at least temporarily accesses and/or stores personally identifying information (e.g., a driver's license, passport, and/or other form of identification). As such, the system 100 can be implemented to grant the relying entity, via the second electronic device 130, with access to the encrypted data associated with the sharing entity that is stored by the server 150. Moreover, the scope of access granted to the relying entity can be defined, controlled, and/or governed by the set of rules (e.g., a consent agreement, license, and/or the like) defined by the first entity via the first electronic device 110, as described in further detail herein.

Figure 3:
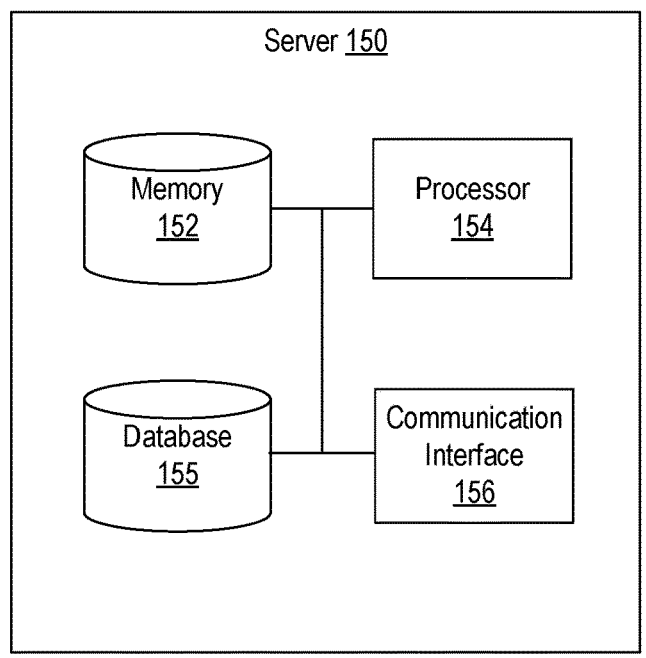

The server 150 can be any suitable hardware-based computing device configured to send and/or receive data via the network 105 and configured to store data such as, for example, the encrypted data received from the first electronic device 110. For example, in some embodiments, the server 150 can be, for example, a PC, device, a workstation, a server device or a distributed network of server devices, a virtual server or machine, and/or the like. As shown in FIG. 3, the server 150 can include at least a memory 152, a processor 154, and a communication interface 156. The memory 152, the processor 154, and the communication interface 156 can be connected and/or electrically coupled (e.g., via a system bus or the like) such that electric and/or electronic signals may be sent between the memory 152, the processor 154, and the communication interface 156. The server 150 can also include and/or can otherwise be operably coupled to a database 155 configured, for example, to store data associated with files accessible via the network 105, as described in further detail herein.

The memory 152 of the server 150 can be, for example, a RAM, a memory buffer, a hard drive, a ROM, an EPROM, a flash memory, and/or the like. The memory 152 can be configured to store, for example, one or more software modules and/or code that can include instructions that can cause the processor 154 to perform one or more processes, functions, and/or the like (e.g., processes, functions, etc. associated with storing encrypting data and/or granting access to encrypted data according to one or more rules). In some implementations, the memory 152 can be physically housed and/or contained in or by the server 150. In other implementations, the memory 152 and/or at least a portion thereof can be operatively coupled to the server 150 and/or at least the processor 154. In such implementations, the memory 152 can be, for example, included in and/or distributed across one or more devices such as, for example, server devices, cloud-based computing devices, network computing devices, and/or the like.

The processor 154 can be a hardware-based IC and/or any other suitable processing device configured to run or execute a set of instructions and/or code stored, for example, in the memory 152. For example, the processor 154 can be a general purpose processor, a CPU, an APU, an ASIC, a network processor, a front end processor, an FPGA, a PLA, and/or the like. The processor 154 can be in communication with the memory 152 via any suitable interconnection, system bus, circuit, and/or the like. As described in further detail herein, the processor 154 can include any number of engines, processing units, cores, etc. configured to execute code, instructions, modules, processes, and/or functions associated with storing encrypting data and/or granting access to encrypted data according to one or more rules.

The communication interface 156 can be any suitable hardware-based device in communication with the processor 154 and the memory 152 and/or any suitable software stored in the memory 152 and executed by the processor 154. In some implementations, the communication interface 156 can be configured to communicate with the network 105 (e.g., any suitable device in communication with the network 105). The communication interface 156 can include one or more wired and/or wireless interfaces, such as, for example, an NIC. In some implementations, the NIC can include, for example, one or more Ethernet interfaces, OC and/or ATM interfaces, one or more wireless radios (e.g., a WiFi® radio, a Bluetooth® radio, etc.), and/or the like. As described in further detail herein, in some implementations, the communication interface 156 can be configured to receive encrypted data from the first electronic device 110 and can be configured to store the encrypted data without having access to the contents of the encrypted data (e.g., the plaintext). Moreover, the communication interface 156 can be configured to send data to and/or receive data from the second electronic device 130 that is associated with accessing the encrypted data at least temporarily stored by the memory 152 and/or otherwise stored in the database 155.

The memory 152 and/or at least a portion thereof can include and/or can be in communication with one or more data storage structures such as, for example, one or more databases (e.g., the database 155) and/or the like. In some instances, the database 155 can be configured to store encrypted data received from, for example, the first electronic device 110. The database 155 can be any suitable data storage structure(s) such as, for example, a table, a repository, a relational database, an object-oriented database, an object-relational database, a structured query language (SQL) database, an extensible markup language (XML) database, and/or the like. In some embodiments, the database 155 can be disposed in a housing, rack, and/or other physical structure including at least the memory 152, the processor 154, and/or the communication interface 156. In other embodiments, the server 150 can include and/or can be operably coupled to any number of databases. Such databases can be configured to store at least a portion of the data (e.g., encrypted data) accessible and/or otherwise transmitted via the network. In some instances, a database 155 (and/or any other suitable portion of the server 150) can be disposed in a relatively close proximity to a relying entity (e.g., the relying entity owning and/or controlling the second electronic device 130). In some instances, such an arrangement can reduce a communication time between the database 155 (and/or other suitable portion of the server 150) and the second electronic device 130. In some instances, the remote and/or distributed database 155 (or other suitable data storage structure) can be configured to cache the encrypted data and/or a copy of the encrypted data in any suitable physical location.

Although the server 150 is shown and described with reference to FIG. 1 as being a single device, in other embodiments, the server 150 can be implemented as any suitable number of devices collectively configured to perform as the server 150. For example, the server 150 can include and/or can be collectively formed by any suitable number of server devices or the like. In other embodiments, the server 150 can be a virtual machine, virtual private server, and/or the like that is executed and/or run as an instance or guest on a physical server or group of servers. In some such embodiments, the server 150 can be stored, run, executed, and/or otherwise implemented in a cloud-computing environment. Such a virtual machine, virtual private server, and/or cloud-based implementation can be similar in at least form and/or function to a physical machine. Thus, the server 150 can be implemented as one or more physical machine(s) or as a virtual machine run on a physical machine. In other words, the server 150 can be configured to perform any of the processes, functions, and/or methods described herein whether implemented as a physical machine or a virtual machine.

As described above, the system 100 can be implemented to securely store and/or share data according to a sharing entity's level of consent to the data being shared. In some instances, the system 100 and/or aspects of the system 100 can be performed using and/or can be implemented in, for example, JavaScript Object Notation (JSON). In some implementations, JavaScript Object Signing and Encryption (JOSE) can be used as a framework for securely transferring data, authorization information, and/or the like, between parties (e.g., the sharing entity using the first electronic device 110, the relying entity using the second electronic device 130, and/or the server 150).

Figure 4:
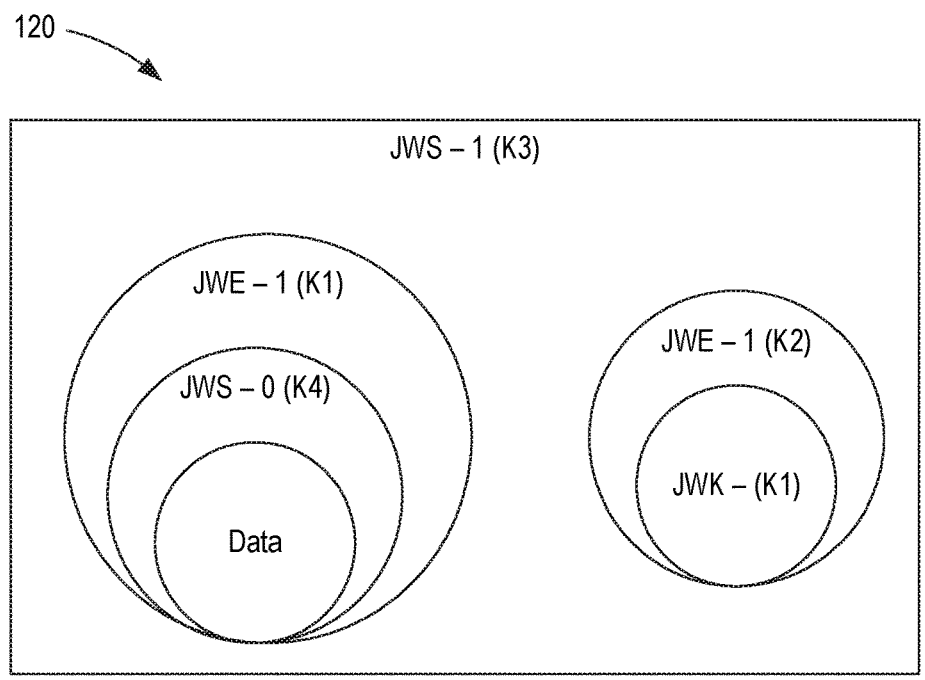
FIG. 4 illustrates an encryption scheme for encrypting sensitive data, according to an embodiment.

For example, FIG. 4 illustrates an example of a JOSE framework and/or schema 120 (referred to herein as "framework") implemented by the system 100. In some instances, the framework 120 can include and/or use one or more standards, languages, protocols, functions, libraries, and/or any other suitable data structure that can allow data (e.g., plaintext data) to be digitally signed, encrypted and/or decrypted, and securely stored and/or shared. By way of example, in some instances, data can be digitally signed by an entity verifying or confirming the authenticity of the data (e.g., by the owner of the data—a sharing entity—or a third party such as an issuer of the data) using, for example, a JSON Web Signature (as indicated in FIG. 4 by the circle labelled JWS-0(K4) encompassing the data) with an encryption key K4; the data (e.g., the signed data) can be encrypted using, for example, JSON Web Encryption (as indicated in FIG. 4 by the circle labelled JWE-1(K1) encompassing the JWS-0(K4) circle) using an encryption key K1; one or more encryption keys K1 can be generated based on, for example, JSON Web Key (as indicated in FIG. 4 by the circle labelled JWK-(K1); encryption keys K1 can be encrypted using an encryption method and an encryption key K2, which are different from the encryption method and encryption key K1, respectively, used to encrypt the data (as indicated in FIG. 4 by the circle labelled JWE-1(K2) encompassing the JWK-(K1) circle) (e.g., encryption key K1 is used to encrypt the data and encryption key K2 is used to encrypt the encryption key K1); and messages sent from the owner of the data (e.g., the sharing entity) to a server or a relying entity (e.g., messages including the encrypted data and encrypted key K1) can be digitally signed by the sharing entity using, for example, a JSON Web Signature (as indicated in FIG. 4 by the box labelled JWS-1(K3)) using an encryption key K3.

While the framework 120 is particularly shown in FIG. 4 and specifically described above, it should be understood that the framework 120 is presented by way of example only and not limitation. In other instances, other frameworks can be used to securely store and/or securely share any suitable data.

Figure 5:
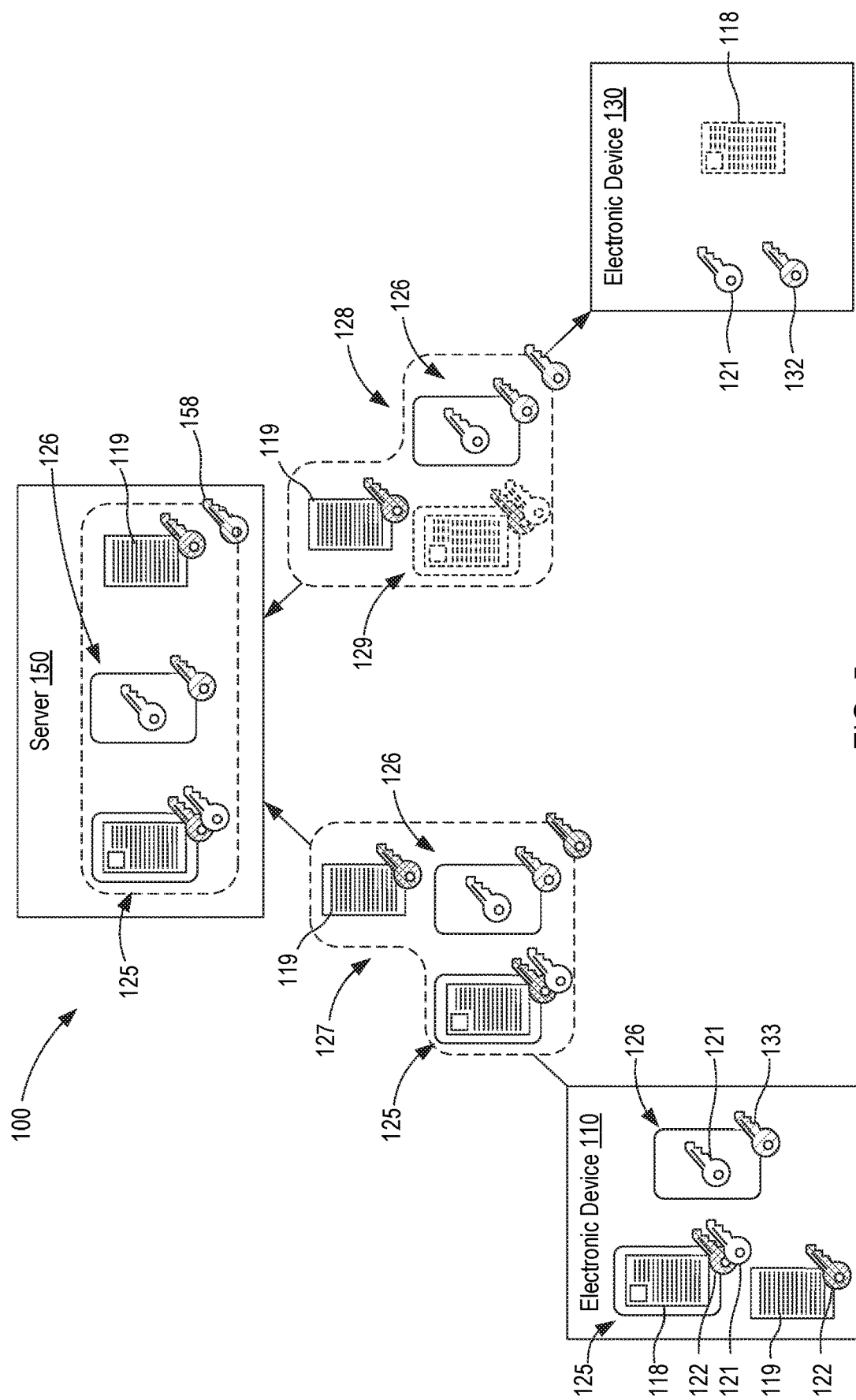
FIG. 5 is a schematic illustration of the system of FIG. 1 showing an electronic device sharing data with at least one of a server or another electronic device.

FIG. 5 illustrates an example of the system 100 being implemented to securely store and/or securely share data. As described above, the data that is securely stored and/or securely shared using the system 100 can be any suitable data having any suitable form and/or including or representing any suitable information. For example, in some instances, the data can be a document 118 that can include and/or that can digitally represent, for example, personally identifying information, personally sensitive information, genetic information, governmental and/or government issued information, confidential information, proprietary information, classified information, and/or any other suitable information (generally referred to herein as "sensitive data"). More particularly, the document 118 can be and/or can include a digital representation of, for example, an identification number, card, and/or document, a driver's license, a passport, a social security number, a tax identification number or identifier, a voter identification number or identifier, a trip itinerary, a manifest, a visa, flight and/or other transportation information or schedule, password information for one or more systems, and/or any other suitable data and/or information. In other instances, the document 118 can include and/or can represent any sensitive data that can be associated with and/or can be about the sharing entity.

While specific examples of data and/or information included in and/or otherwise forming at least a portion of the document 118 are listed above, it should be understood that they have been presented by way of example only and not limitation. Indeed the system 100 can be implemented to store and/or share data having any form and/or including any information in accordance with the embodiments and/or methods described herein.

In general, the document 118 (e.g., a driver's license, passport, and/or the like) can be stored, for example, in the memory 114 (shown in FIG. 2) of the first electronic device 110 and can be registered with the system 100. In some instances, registering the document 118 can include, for example, selecting and/or importing the document 118 and/or data associated with the document 118 into a computer application, mobile application, and/or the like executed on the first electronic device 110 and associated with the system 100. In some instances, the application can include, for example, a user interface associated with the system 100 and presented and/or executed on the first electronic device 110.

The document 118 and/or data included in the document 118 can be in any suitable format and/or arranged in any suitable data structure. For example, in some instances, the document 118 can be a digital representation of the sharing entity's passport or other form of identification, which can be stored, for example, in an industry standard format. In other words, the data and/or the formatting of the data can be in accordance with an industry standard format or the like. In other instances, the document 118 can be a digital representation of the sharing entity's passport or other form of identification and can be stored in a format that is not based on an industry standard and/or is based on an industry standard of a foreign jurisdiction or the like. In some implementations, the sharing entity can register his or her passport or other identification with the system 100 (e.g., store the passport or other form of identification in the memory 114 of the first electronic device 110). In response, the processor 112 (shown in FIG. 2) can execute a computer application, program, script, and/or the like that can receive the data representing the sharing entity's passport or other form of identification and can arrange the data into a normalized and/or predetermined format and/or data structure (e.g., the format and/or data structure of the document 118). In some instances, the normalizing of the data can facilitate the transfer of data into one or more forms, form fields, text boxes, etc. when the document 118 is accessed by the receiving entity, as described in further detail herein.

In some instances, the normalizing of the document 118 can allow data to be rearranged into a known format independent of the type of document 118 and/or format of data registered with the system 100. For example, in some instances, a first sharing entity may save on a first electronic device a digital representation of his or her driver's license for use as a form of identification and a second sharing entity may save on a second electronic device a digital representation of his or her passport for use as a form of identification. In some implementations a computer application, program, script, and/or the like executed by a processor of the first electronic device can be configured to normalize the data received and/or extracted from the first sharing entity's driver's license by arranging the data in a predetermined manner and/or the like. Similarly, the data received and/or extracted by the second electronic device from the second sharing entity's passport can be normalized by arranging the data in the predetermined manner. Thus, in some instances, the document 118 can include data arranged in a known and/or normalized manner independent of the original format of the data. In other words, an electronic device (e.g., the first electronic device 110) can be implemented to normalize the data by defining and/or using a predetermined and/or predefined data structure based on the type of data and/or one or more characteristics associated with the data. In some instances, the electronic device (e.g., the first electronic device 110) can classify and/or identify the predetermined data structure by a generic data type or identifier associated with the normalized data. For example, both passport data and driver's license data can be normalized into a common predetermined data structure classified and/or identified as "User ID," "User Identification," and/or the like. In such instances, an electronic device (e.g., the first electronic device 110) can normalize multiple specific data types and/or document types into a common format and/or data structure and then can classify and/or identify the normalized data using a generic data type or identifier. This can increase the security of the data on the server 150 as the server 150 would be unable to identify and/or ascertain the specific data types (e.g., passport data, driver's license data, etc.), even if the server 150 were able to ascertain the generic data type or identifier (e.g., using the metadata associated with the data).

In some implementations, an electronic device (e.g., the first electronic device 110) can be configured to normalize a dataset (e.g., sensitive data about a sharing entity) that includes sensitive data from any suitable number of sources. For example, in some instances, the sharing entity can save on the first electronic device 110 a digital representation of his or her passport and a digital representation of his or her driver's license. In some such instances, the first electronic device 110 can be implemented to aggregate and/or combine data representing the passport and data representing the driver's license to define an aggregated and/or combined user ID dataset. The first electronic device 110 can then be implemented to normalize the aggregated and/or combined dataset (as described above) into a predetermined and/or predefined data structure. Moreover, the first electronic device 110 can classify and/or identify the normalized dataset (e.g., arranged in the predetermined and/or predefined data structure) as, for example, "User ID," "User Identification," "User Address," "Travel Details," and/or any other suitable classification and/or identification. In some instances, normalizing the data from one or more sources of sensitive data (e.g., passport, driver's license, etc.) can facilitate and/or enhance the sharing of the normalized dataset with the relying entity. In some instances, normalizing the data into a predetermined data structure can allow a relying entity to extract all or a portion of the data, input the data into a form, and/or can otherwise increase an efficiency associated with the relying entity accessing and/or using the shared data. Similar to normalizing data into a common generic format and/or data structure, combining data representing multiple datasets (e.g., a passport and a driver's license) into a generic format and/or data structure can also increase the security of the data on the server 150, as a single non-descript data set can be stored on and shared from the server 150.

As described above, the sharing entity can own and/or can be in control of the first electronic device 110 and, as such, can choose whether to store the document 118 and/or data associated with the document 118 in an encrypted format or an unencrypted format in the memory 114 of the first electronic device 110. In some instances, however, registering the document 118 with the system 100 can include executing one or more processes configured to encrypt the document 118 and/or digitally sign the document 118 such that the document 118 can be securely stored and/or securely shared with one or more relying entities. For example, in some instances, the document 118 can be digitally signed (e.g., based on and/or using JSON Web Signature) using a private encryption key 122 (e.g., based on and/or using JSON Web Key) generated by and associated with the first electronic device 110. In some instances, digitally signing (also referred to herein as "signing") the document 118 with the private encryption key 122 (also referred to herein as "private key") associated with the first electronic device 110 can be indicative of the sharing entity verifying, validating, and/or attesting to the authenticity of the contents of the document 118. Moreover, the relying entity via the second electronic device 130 can use a corresponding public key associated with the first electronic device 110 to verify, decrypt, and/or otherwise interpret the digital signature generated by the private key of the first electronic device 110.

In some instances, one or more third parties can digitally sign the document 118 (or portions of the document) in addition to or as an alternative to the first electronic device 110 signing the document 118. For example, the document 118 can be and/or can include data that digitally represents a government issued identification such as a passport. In some implementations, a governmental agency issuing the identification (e.g., the U.S. State Department in the case of a passport) can digitally sign the document 118 (e.g., using a private encryption key associated with the agency) to verify, validate, and/or attest to the authenticity, validity, or fact of the contents of the document 118. In other words, the governmental agency can sign the document 118 to prove that the information associated with the sharing entity accurately reflects the information in that agency's records.

In some implementations, a third party entity, a verifying entity, an issuing entity, a certification authority, etc. (e.g., a governmental agency) can perform additional verifications such as, for example, performing a physical analysis of the identification that at least a portion of the data in the document 118 digitally represents. For example, in some instances, a human employee of the U.S. State Department can analyze a physical passport to determine if the underlying identification is authentic. In other instances, the physical passport can be analyzed, inspected, and/or verified via one or more electronic inspections, scans, processes, etc. In some instances, inspection of a physical credential or document such as a passport can include a combination of human inspection and electronic inspection. If the third party verifies the authenticity of both the physical identification and the digital representation of the identification (e.g., contained in and/or represented by the document 118), the third party can attest to the authenticity by digitally signing the document 118 using, for example, a private encryption key associated with the third party.

In some instances and/or implementations, a verifying entity can review, analyze, and/or verify physical identification or other physical items as well as digital versions and/or representations thereof as part of a process of registering the document 118 with the system 100. In other words, a verifying entity can verify information in a document 118 and can digitally sign at least a portion of the document 118 automatically as part of a registration process. In other instances, the sharing entity, the relying entity, and/or the system 100 can request verification of the document 118 in accordance with, for example, one or more rules, licenses, security protocols, security methods, security levels, and/or the like. For example, in some instances, a sharing entity and/or a relying entity can define security level or protocol that calls for all data in the document 118 to be verified, for example, by a third party verifying entity, an issuing entity, a governmental agency, a certification authority, and/or the like. Moreover, in some instances and/or implementations, the verifying entity can digitally sign the document 118 prior to the document 118 being encrypted by the sharing entity, which can enhance the security of the document 118 by obfuscating the digital signature(s) via encryption of the signed document 118.

As described above, the relying entity via the second electronic device 130 can use a corresponding public key associated with the government agency to verify, decrypt, and/or otherwise interpret the digital signature generated by the private key of a verifying entity (e.g., a government agency and/or the like). Moreover, the relying entity via the second electronic device 130 can use a public key associated with any entity (or an electronic device owned or controlled by that entity) or combination of entities that have digitally signed the document 118 and/or at least a portion of the data included in or represented by the document 118. In some instances, the relying entity first decrypts the document 118 prior to being able to verify, decrypt, and/or otherwise interpret the digital signature(s) of one or more verifying entities.

In some instances, the digital signature on or associated with the document 118 (or portion thereof) provided by the first electronic device 110, the governmental agency, and/or any other suitable third party(ies) can each represent different assertions of authenticity and/or fact associated with the document 118. In addition, in some implementations, the one or more third parties can verify and/or physically inspect a physical object that includes information that is digitally included or represented in the document 118. For example, a state's department of motor vehicles (DMV) can inspect the sharing entity's physical driver's license in addition to data included in the document 118 that corresponds to and/or otherwise represents the information presented on the physical driver's license. In such implementations, the third party can assert that the data included in the document 118 is authentic or fact, that a physical object including information on which the data is based (e.g., a driver's license) is authentic or fact, that the physical object and/or the data included in the document 118 is properly representative of and/or properly associated with the sharing entity, and/or any other suitable assertion of authenticity or fact. Moreover, the physical inspection can be performed via human inspection and/or electronic inspection (e.g., via one or more scans and/or detection processes).

In some instances, a first entity can digitally sign a first portion of the document 118 that includes data authorized and/or verified by the first entity and a second entity can digitally sign a second portion of the document that includes data authorized and/or verified by the second entity. For example, in some instances, the document 118 and/or a first portion thereof can include data from and/or representing the sharing entity's passport and the document 118 and/or a second portion thereof can include data from and/or representing the driver's license of the sharing entity. In such instances, the U.S. State Department having issued the sharing entity's passport can digitally sign (e.g., using a private key associated with the U.S. State Department) the document 118 and/or the first portion of the document 118 to authenticate and/or verify that the data included therein is accurate and/or verified according to the State Department's records. Similarly, a state's DMV having issued the sharing entity's driver's license can digitally sign (e.g., using a private key associated with the DMV) the document 118 and/or the second portion of the document 118 to authenticate and/or verify that the data included therein is accurate and/or verified according to the records of that state's DMV.

In some instances, the U.S. State Department can also inspect, authenticate, and/or verify the sharing entity's physical passport on which at least part of the data included in the document 118 is based and the DMV can also inspect, authenticate, and/or verify the sharing entity's physical driver's license on which at least a part of the data included in the document is based. In some instances, inspection, authentication, and/or verification of the physical credential or physical document (e.g., the passport, the driver's license, etc.) can be performed via, for example, human inspection. In other instances, inspection, authentication, and/or verification of the physical credential or physical document can be performed via one or more electronic inspections, observations, scans, etc. In some implementations, the human and/or electronic inspection can be performed to identify and/or detect tampering of the physical credential or document, signs counterfeiting, and/or the like.

While described in this example as signing the document 118 and/or two separate portions of the document 118 (e.g., two portions of the same document), in other instances a first document (e.g., passport) can be signed by a first entity (e.g., State Department) and a second document (e.g., driver's license) can be signed by a second entity (e.g., DMV). The first electronic device 110 can bundle, combine and/or aggregate the first document and the second document to define a data package, and can sign the data package prior to sending to the server 150.

In some instances and/or implementations, the verifying, authenticating, and/or issuing entity can digitally sign the document 118 prior to the document 118 being encrypted by the sharing entity, which can enhance the security of the document 118 by obfuscating the digital signature(s) via encryption of the signed document 118. In some implementations, the sharing entity can encrypt portions of the document 118 (or multiple documents or subdocuments of a data package or the like) based on one or more digital signatures associated with each portion (or subdocument), can aggregate and/or combine the encrypted portions (or subdocuments), and then can encrypt the aggregated and/or combined encrypted portions (or subdocuments). Similarly stated, the document 118 can be encrypted using multiple layers of encryption and/or multiple encrypted sections, portions, subdocuments, etc. In some instances, the layers, sections, portions, subdocuments, etc. can be based on, for example, the type, topic, or use of the data, the digital signature(s) included and/or associated with the layer, section, portion, subdocument, and/or the like. In some instances, such an implementation can allow the sharing entity to control access to the aggregated encrypted document 118 (or data package) as a whole and/or to one or more encrypted portions, sections, and/or subdocuments of the document 118. As described in further detail herein, the sharing entity can define one or more permissions, rules, restrictions, licenses, etc. controlling who can access each portion of the document 118 and/or how each portion of the document 118 can be accessed.

As described above, in some implementations, the first electronic device 110 can be configured to normalize data from any number of sources to define a predetermined data structure that can be included in and/or that can form at least a portion of the document 118. In the example described above, the State Department and the DMV of the corresponding state can digitally sign the document 118 and/or the data prior to the first electronic device 110 normalizing the data into the predetermined and/or predefined data structure or after the first electronic device 110 has normalized the data. As described in further detail herein, the first electronic device 110 can be implemented to encrypt the document 118 (e.g., after the document has been signed by one or more entities authenticating and/or verifying a corresponding portion of the data) to define an encrypted document, which the first electronic device 110 can then digitally sign to authenticate and/or verify that the information contained therein is data about and/or associated with the sharing entity and/or to authenticate, verify, and/or otherwise provide proof that the encrypted document has been sent from the sharing entity (e.g., via the first electronic device 110). Thus, in the above example, a first portion of the data can be signed by a first entity, a second portion of the data can be signed by a second entity, the first electronic device 110 can bundle, combine and/or aggregate the first portion of the data and the second portion of the data to define a data package, and can sign the data package prior to sending to the server 150. In addition, in some instances, the document 118 (and/or the encrypted copy of the document 118) can be signed with a digital signature associated with and/or representing the system 100, the server 150, and/or an authenticating entity associated with the system 100, which can be used to assert, for example, that the document 118 (and/or the encrypted copy of the document 118) is being shared within a trusted community, network, and/or system (e.g., the system 100). Accordingly, the data to be shared can be signed by multiple parties depending on the type and/or source of the data.

In addition to being signed by one or more parties or entities depending on the type and/or source of the data, the document 118 can be encrypted by the first electronic device 110 in response to being registered with the system 100. For example, in some implementations, the processor 112 of the first electronic device 110 can execute one or more processes associated with encrypting the document 118 based on and/or using JSON Web Encryption. In some implementations, the encryption can be, for example, symmetric-key encryption. As such, the first electronic device 110 can generate one or more symmetric encryption keys 121 (also referred to herein as "symmetric key(s)") that can be used to encrypt the document 118. Thus, the first electronic device 110 can be configured to define and at least temporarily store a signed and encrypted copy of the document 118 (referred to herein as "encrypted document" 125), as shown in FIG. 5. In addition, the one or more symmetric keys 121 can be used (e.g., by the relying entity and/or the second electronic device 130 owned or controlled by the relying entity) to decrypt the document 118, as shown in FIG. 5.

In some instances, the system 100 and/or a portion thereof can provide and/or can define one or more cryptographic interfaces, libraries, resources, tools, code, instructions, scripts, applications, etc. (collectively referred to as "cryptographic functions") that can be used, for example, by the first electronic device 110 and/or the second electronic device 130 to encrypt and/or decrypt the document 118. In general, an operating system executed on an electronic device is configured and/or can be configured to provide at least some functions for encryption. In some implementations of the system 100, however, the first electronic device 110 and/or the second electronic device 130 can provide and/or can execute cryptographic functions and/or the like provided by the system 100 that would otherwise be provided by the operating system executed on the first electronic device 110 and/or the second electronic device 130, respectively. In other words, the first electronic device 110 and/or the second electronic device 130 can be implemented to execute any suitable cryptographic functions associated with encryption, decryption, and/or digitally signing (e.g., as part of a native application on the first electronic device 110 and/or the second electronic device 130) without using the cryptographic functions and/or the like otherwise provided by their respective operating systems (e.g., using non-operating system (non-OS) based encryption methods, functions, protocols, etc.).

In some instances, such a configuration can allow the system 100, and/or the first electronic device 110 and the second electronic device 130 being implemented as part of the system 100, to verify proper encryption and/or security processes and/or procedures. In some implementations, one or more libraries, code, instructions, scripts, applications, and/or the like that can be implemented and/or executed by the first electronic device 110 and/or the second electronic device 130 (e.g., independent of their respective operating systems) to verify a sequence of any number of security layers and/or processes associated with encrypting the document 118.

In some instances, using the cryptographic functions defined and/or provided by the system 100 (e.g., as part of a native application on the first electronic device 110 and/or the second electronic device 130) can allow for faster adoption of and/or updating to new encryption methods than may otherwise result from using operating system-based cryptographic functions. Moreover, in some instances, not relying on cryptographic functions otherwise provided by an operating system can, for example, increase a security and/or strength of encryption of the document 118 and/or can increase an efficiency of the first electronic device 110 and/or the second electronic device 130 while performing and/or executing one or more cryptographic processes and/or functions. As an example, using cryptographic functions that do not rely on operating systems can ensure uniformity across devices that may not have the same operating systems (e.g., across the first electronic device 110 and/or the second electronic device 130). As another example, using cryptographic functions that do not rely on operating systems can ensure cryptographic methods are up-to-date, without relying on the operating system to be up-to-date.

In some implementations, any of the electronic devices included in the system 100 can execute any suitable combination of operating system-based cryptographic functions or non-operating system-based cryptographic functions (e.g., as part of a native application). For example, in some instances, an electronic device (e.g., the first electronic device 110 or the second electronic device 130) can use non-OS-based cryptographic functions to encrypt and/or decrypt the document 118 and can use OS-based cryptographic functions to digitally sign data and/or to verify a digital signature. In other instances, the first electronic device 110 and/or the second electronic device 130 can use non-OS-based cryptographic functions for encryption, decryption, and digitally signing, while a third electronic device (not shown) such as a verifying entity can use OS-based cryptographic functions to digitally sign at least a portion of the document 118 and/or other data. In still other embodiments, the electronic devices included in the system 100 can use and/or implement any suitable combination of cryptographic functions.

After generating the symmetric key 121, the first electronic device 110 can be configured to execute one or more processes associated with encrypting the symmetric key 121 based on and/or using JSON Web Encryption. In some implementations, the encryption can be, for example, asymmetric-key encryption. For example, the first electronic device 110 can be configured to encrypt the symmetric key 121 with a public encryption key 133 (also referred to herein as "public key") associated with the relying entity and/or the second electronic device 130 owned and/or controlled by the relying entity. As described above, a public key associated with an electronic device and/or an entity owning and/or controlling that electronic device can be published and publically available, and data encrypted using that public key can be decrypted using the private key for that electronic device and/or entity. As such, the first electronic device 110 can be configured to define and/or at least temporarily store an encrypted copy of the symmetric key 121 (referred to herein as "encrypted key" 126), as shown in FIG. 5.

While the first electronic device 110 is shown as defining the encrypted key 126 using the public key 133 of the second electronic device 130, in some implementations, the first electronic device 110 can define any number of copies or instances of the symmetric key 121 and can encrypt each copy or instance using, for example, a public key associated with a different relying entity with whom the sharing entity intends to share the document 118. In some instances, such a configuration and/or implementation can allow, for example, a single copy or instance of the encrypted document 125 to be securely shared with any suitable number of relying entities, as described in further detail herein.

In other instances, the first electronic device 110 can be implemented to generate any suitable number of copies of the document and can encrypt each copy of the document 118 using a different symmetric key. In such instances, each symmetric key can be associated with and/or intended to be used by a different relying entity and/or an electronic device owned and/or controlled by different relying entities. As described in further detail herein, such an implementation can allow the sharing entity (e.g., via the first electronic device 110) to independently define one or more permissions, rules, licenses, and/or the like for each relying entity associated with accessing the corresponding copy of the encrypted document 125. For example, in some instances, the sharing entity can consent to sharing the document 118 with a first relying entity (e.g., a hotel) for a first period of time and can consent to sharing the document 118 with a second relying entity (e.g., an airline) for a second period of time different from the first period of time. As such, defining and/or generating multiple copies of the encrypted document 125, each encrypted using a different symmetric key 121 can allow the sharing entity to define an independent scope of consent associated accessing the document for each relying entity.

As shown in FIG. 5, in some implementations, the first electronic device 110 can be configured to define and/or generate a license 119. In some instances, the license 119 can be indicative of and/or can include a set of rules defining the scope of consent granted by the sharing entity to, for example, a relying entity. For example, in some instances, the license can be indicative of and/or can include a set of rules governing the sharing the document 118 to a relying entity for a limited duration (e.g., from a defined start date to a defined end date), for a limited or particular purpose, within a limited and/or particular jurisdiction and/or predetermined geographic region or area, within a limited and/or particular distance from the sharing entity and/or the first electronic device 110, a number of times that a relying entity may access the document 118, a predetermined list of individuals (e.g., associated with the relying entity) permitted to access the document 118, one or more security protocols or policies governing the relying entity's access to the document 118, and/or the like.

In some instances, the license 119 can include information associated with the relying entity such as, for example, identity, contact information, physical or geographic location, privacy policies, stated purpose or need for using and/or accessing the document 118, applicable regulations and/or regulatory bodies, and/or any other suitable information. In addition, the license 119 can include a set of rules that can control and/or are indicative of the sharing entity's consent to storing the encrypted document 125 on the server 150 and/or any other remote storage device. Moreover, in some instances, the license 119 can include any suitable metadata associated with and/or providing at least limited information about the encrypted document 125. In some such instances, the server 150 can use the metadata to classify and/or identify the encrypted document 125 without accessing the contents of the document 118 (e.g., the document 118 is a "User ID" associated with the sharing entity).

In some instances, for example, the server 150 can assign and/or define a global unique identifier for the encrypted document 125, which can allow for tracking and/or updating of the encrypted document 125 within the system 100.

In some instances, the license 119 can be digitally signed using the private key 122 of the first electronic device 110. Moreover, in some instances, the license 119 can be countersigned by a relying entity, a system administrator, an authenticating entity, and/or any other suitable party. As such, the countersigned license 119 can be stored and/or accessible to both the sharing entity and the relying entity and can be indicative of each entity's acknowledgment of the terms of sharing the document 118. In some instances, the countersigned license 119 can be stored by the sharing entity and/or the relying entity and can be, for example, a consent receipt or the like providing evidence and/or a record of the agreement between the sharing entity and the relying entity. In other instances, a consent receipt can be a standardized and/or structured document separate from the license 119 that includes information and/or data associated with and/or otherwise recording the agreement between the entities.

While the license 119 and the encrypted key 126 are shown in FIG. 5 as being separate and/or independent objects, in other instances, the first electronic device 110 can be implemented to embed and/or include the encrypted key 126 into and/or as a part of the license 119. In some instances, the license 119 and the encrypted key 126 can be generated in one or more of the same processes and/or one or more parallel processes. In other instances, the license 119 and the encrypted key 126 can be generated individually and/or in separate processes and later combined such that the encrypted key 126 is included and/or embedded in the license 119.

As described above, in some implementations, the first electronic device 110 can send the encrypted document 125, the encrypted key 126, and/or the license 119 to the server 150 and the server 150 can store the encrypted document 125, the encrypted key 126, and/or the license 119. For example, in some instances, the sharing entity, via the first electronic device 110, can send one or more messages and/or signals to the server 150 to cause the server 150 to store the encrypted document 125, the encrypted key 126, and/or the license 119. In some instances, the encrypted document 125, the encrypted key 126, and/or the license 119 can be sent via a signed message 127 from the first electronic device 110, as shown in FIG. 5. While the encrypted document 125, the encrypted key 126, and/or the license 119 are shown as being sent as separate objects and/or the like included in the message 127, in other instances, the encrypted document 125, the encrypted key 126, and/or the license 119 can be combined into a single object and/or data structure or into two objects and/or data structures. For example, as described above, in some instances, the encrypted key 126 can be included and/or embedded in the license 119 and, as such, the message 127 sent from the first electronic device 110 can include two objects and/or data structures—the encrypted document 125 and the license 119.

In some instances, the message 127 can be encrypted via any suitable encryption method. In other instances, the message 127 can be signed but need not be encrypted based at least in part on the document 118 and the symmetric key 121 already being encrypted. Moreover, encrypting the symmetric key 121 with the public key 133 of the second electronic device 130 ensures that the server 150 does not have access to and/or otherwise lacks the ability to decrypt the encrypted symmetric key 126 and thus the encrypted document 125. Accordingly, the encrypted document 125 and the encrypted symmetric key 126 can be securely stored on the server 150 without the server 150 being able to access the encrypted document 125 and the encrypted symmetric key 126.

As shown in FIG. 5, the server 150 can also store the license 119. In some instances, the first electronic device 110 can encrypt the license 119 with, for example, a public encryption key associated with the server 150. In other instances, the server 150 can be configured to encrypt the license 119 upon receipt using, for example, a symmetric encryption key or any other suitable encryption key. In still other instances, the license 119 need not be encrypted. While the server 150 is described above as storing, in the memory 152 and/or the database 155, the encrypted document 125, the encrypted key 126, and the license 119 as separate objects and/or the like, in other instances, the server 150 can be configured to save and/or store the encrypted document 125, the encrypted key 126, and/or the license 119 in any suitable manner. For example, in some instances, the server 150 can be configured to save and/or store the encrypted document 125, the encrypted key 126, and/or the license 119 as a single object and/or data structure, which can be digitally signed by the server 150 using a private encryption key 158 associated with the server 150, as shown in FIG. 5.

In some instances, the message 127 can be and/or can have a normalized format and/or data structure that can enable and/or allow the server 150 to identify, categorize, classify, and/or otherwise process the message 127. Moreover, in some instances, the message 127 can include metadata associated with the encrypted document 125. For example, in some implementations, the encrypted document 125 can be sent to the server 150 along with metadata associated with and/or identifying the underlying document 118 (as described above). The metadata can include, for example, the owner of the document 118, a size and/or format of the document 118, a normalized type of the document 118 (e.g., an identification document), a list of relying entities entitled to access the document 118, and/or any other suitable metadata. Accordingly, the server 150 can process the encrypted document 125 and can securely store the encrypted document 125 without having access to the contents (e.g., plaintext) of the document 118. In other instances, the sharing entity, via the first electronic device 110, can consent (e.g., in the license 119 and/or via any other suitable indication) to the server 150 having access to the contents of the document 118. Moreover, in some instances, the server 150 can normalize the metadata into a predetermined and/or predefined data structure. In such instances, normalizing the metadata can facilitate the storing of any number of encrypted documents and/or can increase efficiency of the server 150 storing and/or identifying the encrypted documents.

In some instances, the server 150 can be configured to store at least the encrypted document 125 and the encrypted key 126 in a portion of the memory 152 and/or a portion of the database 155 that is physically located within a desired distance from the relying entity authorized to access the document 118. For example, in some implementations, the server 150 can be a distributed network of servers 150 and/or can include a distributed network of storage devices, memory locations, and/or databases. As such, based on data and/or metadata included in the message 127, at least the encrypted document 125 and encrypted key 126 can be routed to a storage device of the server 150 that is physically located closest to a physical location of a relying entity having access to the document 118 (e.g., a location relative to the location of the relying entity that allows for the shortest amount of time to retrieve and/or access the document 118). In other instances, the message 127 can be sent to the server 150 and, on receipt, the server 150 can determine a desired location for storing at least the encrypted document 125 and the encrypted key 126. In some instances, the server 150 can cache one or more copies, instances, and/or references in any number of storage locations and/or any number of databases 155 having any suitable physical location. In some instances, the server 150 can receive, for example, global positioning system (GPS) coordinates and/or any other suitable location data from a relying entity and/or an electronic device owned and/or controlled by the relying entity.

For example, in some instances, the sharing entity can book a cruise on a specific cruise ship that has a security protocol directing systems on the cruise ship to have access to, for example, sensitive data about and/or associated with the sharing entity (e.g., access to the document 118). As such, the first electronic device 110 can send the encrypted document 125, the encrypted key 126, and the license 119 to the server 150, which in some instances, can be implemented to cache a copy of the encrypted document 125, the encrypted key 126, and/or the license 119 in a memory of an electronic device on the cruise ship. In other words, a physical and/or virtual portion of the server 150, the memory 152 of the server 150, and/or the database 155 of the server 150 can be physically located on or in proximity of the cruise ship. In such instances, such a cached copy of the document 118 can be provided prior to the systems on the cruise ship needing access to the document 118. The server 150 can identify that the systems on the cruise ship will need access based on the metadata and/or the license 119 associated with the document 118. For example, the metadata can include information about the relying party and/or entity such as a location, date that the document 118 will be used, and/or the like. Based on this information, the server 150 can cache the document on the correct cruise ship at the appropriate time. In other instances, such caching can be performed at other locations (e.g., at a specific server at a specific time based on a physical and temporal proximity associated with the license 119 and/or metadata of the document 118). This can increase the reliability of access and speed of access of the document 118 by the relying entity, especially where network access may not be as reliable.

Continuing with the above example, in other instances, the cruise ship can be a relying entity that is separate from the server 150 and the server 150 can send the encrypted document 125, the encrypted key 126, and the license 119 to an electronic device physically located on the cruise ship. In some such instances, the server 150 can be configured to monitor access of the encrypted document 125 by the cruise ship (and/or an electronic device of the cruise ship) to ensure compliance with the scope of consent granted by the sharing entity and defined, for example, in the license 119. In some instances, such an implementation can increase efficiency associated with storing and/or accessing the encrypted document 125, and/or can increase an efficiency associated with the operation of the server 150 and/or an electronic device of the relying entity (e.g., the electronic device of the cruise ship). Moreover, in the example provided above, caching a copy of the encrypted document 125 in the memory of the electronic device of the cruise ship can allow a party or entity on the cruise ship to access the encrypted document 125 whether the cruise ship (or the electronic device thereof) has access to a network (e.g., the network 105), the Internet, and/or the like.

As shown in FIG. 5, the system 100 can share the encrypted document 125 with the relying entity, via the second electronic device 130, in accordance with the consent granted in the license 119. For example, in some instances, the server 150 can be configured to send one or more messages 128 to the second electronic device 130 that can include, for example, at least the encrypted key 126. In some instances, the message 128 can include the encrypted key 126 and a reference, link, pointer, and/or the like (referred to as "link" 129, as shown in FIG. 5) to the encrypted document 125 stored on the server 150, and/or the license 119. In some instances, the server 150 can be configured to sign the message via the private key 158 associated with the server 150. In other instances, the server 150 can send the encrypted document 125 (or the link 129), the encrypted key 126, and the license 119 as a single signed object and/or data structure (e.g., the message 128 includes the single object and/or data structure that was stored on or by the server 150 and signed using the private key 158 associated with the server 150). In other instances, the server 150 can separately sign the encrypted document 125, the encrypted key 126, and/or the license 119 prior to sending to the second electronic device 130.

The server 150 can be implemented such that the server 150 sends the message 128 in accordance with instructions included in the license 119 (e.g., a starting date and/or time for sharing the document 118). In other instances, the server 150 can send the message 128 in response to a request to access the document 118 received from the second electronic device 130. In still other instances, the server 150 and/or the first electronic device 110 can receive the request to access the document 118 from the second electronic device 130 and the server 150 can send the message 128 only after the sharing entity, via the first electronic device 110, provides an indication of the sharing entity's consent to the access.

Upon receipt of the message 128, the second electronic device 130 can decrypt the encrypted key 126 to access the underlying symmetric key 121. More particularly, as described above, the symmetric key 121 can be encrypted using, for example, the public key 133 associated with the second electronic device 130. Thus, the second electronic device 130 can use its private key 132 to decrypt the encrypted key 126. In some implementations, the second electronic device 130 can use the link 129 to access the encrypted document 125 stored on the server 150. For example, the link 129 can be a hyperlink or pointer that can direct the second electronic device 130 to a location in the memory 152 and/or database 155 of the server 150 where the encrypted document 125 or a copy thereof is saved. Thus, using the symmetric key 121, the second electronic device 130 can decrypt the encrypted document 125 to access the underlying document 118. In some instances, the relying entity can access the contents of the document 118 without downloading and locally saving the contents of the document 118. Such an arrangement can allow the sharing entity to maintain control over how his or her information (e.g., the document 118) is accessed and/or can otherwise ensure that the relying entity does not share the document 118 with unauthorized parties. In other instances, the sharing entity, via the first electronic device 110 and/or the license 119, can consent to the relying entity downloading a copy of the document 118 and locally storing the document 118 (e.g., in the memory of the second electronic device 130) according to the consent (e.g., rules) in the license 119. For example, in some such instances, the license 119 can include rules and/or instructions that when executed by the second electronic device 130 result in the locally stored document 118 timing out, being deleted from memory, and/or being locked or otherwise blocked from being accessed.

As described above, the license 119 can specify and/or represent instructions, rules, permissions, restrictions, and/or information that can control one or more aspects of the second electronic device 130 accessing the document 118. In some instances, for example, the license 119 can define a time period during which the relying entity is granted access to the document 118. In such instances, the server 150 can be configured to reject, deny, and/or otherwise block a request to access the document 118 from the relying entity that is outside of the time period. Similarly, the server 150 can be configured to determine any suitable information, parameter, configuration, location, etc. associated with the second electronic device 130 and can perform one or more checks against the consent (e.g., rules) in the license 119. In such instances, if the second electronic device 130 fails to comply with one or more rules and/or terms of the license 119, the server 150 can block, reject, deny, disable, and/or otherwise prevent the relying entity, via the second electronic device 130, from accessing the document 118. In other words, the server 150 can be configured to grant the second electronic device 130 (e.g., the relying entity) access to the document 118 in response to a consent criterion or criteria (e.g., defined in or by the license 119) being satisfied and can be configured to deny access to the document 118 if the consent criterion or criteria is/are not satisfied.

While the system 100 is described above as being implemented such that the sharing entity, via the first electronic device 110, sends the message 127 to the server 150, for example, in anticipation of a need to share the document 118 and/or as an initial step in the process or method of sharing the document 118, in other instances, the relying entity, via the second electronic device 130, can send a request to access the document 118. In some such instances, the request can be sent to the server 150, which in turn routes and/or directs the request and/or sends a signal representing the request, to the first electronic device 110 (the sharing entity). In other instances, the request can be sent from the second electronic device 130 to the first electronic device 110 without passing through and/or being routed by the server 150.

In some instances, the request can be and/or can include, for example, a license, consent receipt, request form, and/or any other suitable document that can include, for example, information and/or data describing and/or otherwise associated with one or more rules, parameters, requests, policies, criteria, etc. proposed and/or asserted by the relying entity. For example, the request, the license, the consent receipt, etc. included in the request can include information and/or data describing a time period that the relying entity is granted access to the document 118, a predetermined geographic location and/or area of the relying entity where the document 118 will be accessed, a predetermined list of individuals that will be permitted to access the document 118, one or more security protocols or policies that will govern the relying entity's access to the document 118, and/or any other suitable information and/or data. As such, the sharing entity can review one or more details, terms, and/or rules governing how the second electronic device 130 will access the document 118 and, via the first electronic device 110, can consent to or reject each term and/or the request as a whole (e.g., by signing the license and/or consent receipt with the private key 122 of the first electronic device 110). In some instances, the request, license, and/or consent receipt, and/or data included therein, can be included and/or incorporated into the license 119 generated by the first electronic device 110. Accordingly, as described herein, the process of sharing the document 118 can start with and/or can be initiated by either the sharing entity (e.g., via the first electronic device 110) and/or the relying entity (e.g., via the second electronic device 130).

Figure 6:
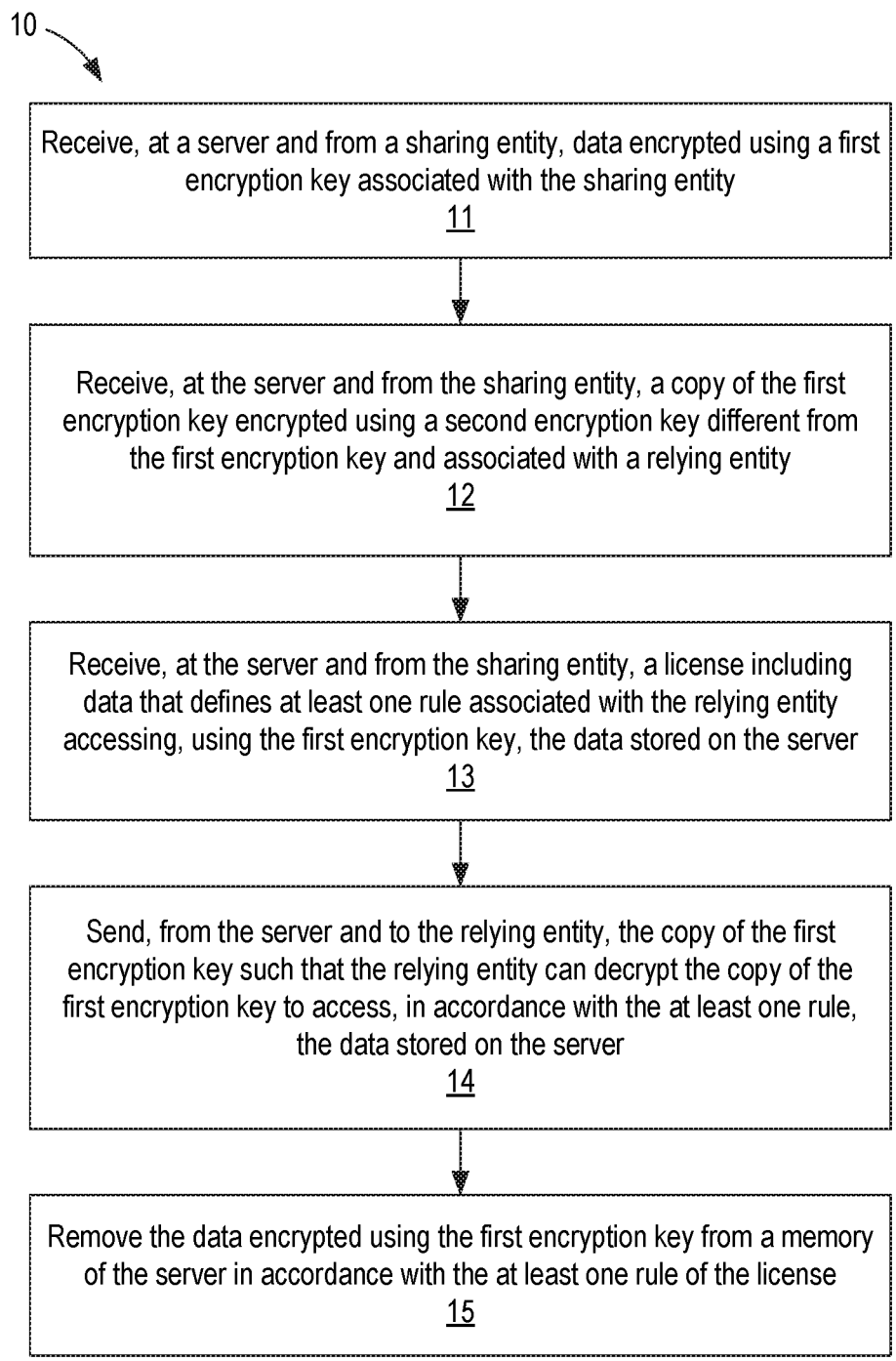
FIG. 6 is a flowchart illustrating a method of using a system for securely and efficiently storing and sharing sensitive data with a relying entity, according to an embodiment.

Referring now to FIG. 6, a flowchart is shown illustrating a method 10 of a system implemented to securely store data and/or securely share the data with a relying entity, according to an embodiment. In some embodiments, the system can be similar to and/or substantially the same as the system 100 described in detail above. As such, the system 100 can include one or more electronic devices (e.g., the first electronic device 110 and the second electronic device 130) and a server (e.g., the server 150) that are in communication via a network (e.g., the network 105).

In some implementations, the server receives from a sharing entity data that is encrypted using a first encryption key associated with the sharing entity, at 11. For example, in some instances, the sharing entity can be and/or can use or manipulate an electronic device (e.g., the first electronic device 110) to register data with the system. In some instances, the data can be, for example, a document or the like including sensitive data associated with the sharing entity. For example, in some instances, the data and/or document can be and/or can represent identifying information such as the sharing entity's passport, driver's license, and/or the like. In other instances, the data can be any suitable data in any suitable form or format.

As described above with reference to FIG. 5, in some instances, the registering of the data and/or document with the system can include digitally signing the data and encrypting the data. In some implementations, the digitally signing can be performed using, for example, a private encryption key associated with the sharing entity and/or the electronic device owned and/or controlled by the sharing entity. The data can be encrypted using, for example, symmetric-key encryption. Accordingly, when the data is registered and encrypted, the electronic device can also generate the symmetric encryption key (e.g., the first encryption key), which can be used to encrypt the data to define encrypted data and decrypt the encrypted data.

The server receives from the sharing entity (and/or the electronic device owned and/or controlled by the sharing entity) a copy of the first encryption key that is encrypted using a second encryption key different from the first encryption key and associated with the relying entity (and/or an electronic device owned and/or controlled by the relying entity), at 12. For example, the electronic device owned and/or controlled by the sharing entity can be implemented to encrypt the symmetric encryption key (e.g., the first encryption key) using, for example, asymmetric-key encryption (e.g., using the second encryption key different from the first encryption key). As described in detail above, the asymmetric-key encryption can be performed and/or executed by the electronic device using, for example, a public encryption key of the relying entity and/or the electronic device (e.g., the second electronic device 130) owned and/or controlled by the relying entity. Accordingly, after the electronic device owned and/or controlled by the sharing entity encrypts the symmetric key, the electronic device (e.g., the sharing entity) can be configured to send the encrypted copy of the first encryption key to the server.

The server receives from the sharing entity (and/or the electronic device owned and/or controlled by the sharing entity) a license including data defining at least one rule associated with the relying entity accessing, using the first encryption key, the data stored on the server, at 13. For example, the sharing entity can manipulate the electronic device to define a set of rules, parameters, conditions, and/or permissions controlling how the data can be shared with the relying entity (and/or the electronic device owned and/or controlled by the relying entity). In some instances, the license can include and/or can define a scope of consent to access granted by the sharing entity. As described in detail above with reference to FIG. 5, the license and/or consent can include rules defining a time during which the relying entity (e.g., via the electronic device owned and/or controlled by the relying entity) may access the data, a geographic location or range in which the relying entity can use the electronic device to access the data, one or more purposes for accessing the data, and/or any other suitable rules or the like. In some instances, the license, rules, and/or consent can be and/or can define one or more consent criterion or criteria and access to the data by the relying entity (and/or the electronic device owned and/or controlled by the relying entity) can be dependent and/or contingent on the satisfaction of the consent criterion or criteria. Accordingly, after the electronic device owned and/or controlled by the sharing entity defines and/or generates the license, the electronic device can be configured to send the license to the server.

In some instances, the server sends to the relying entity (and/or the electronic device owned and/or controlled by the relying entity) the copy of the first encryption key such that the relying entity (e.g., via the electronic device owned and/or controlled by the relying entity) can decrypt the copy of the first encryption key to access, in accordance with the at least one rule, the data stored on the server, at 14. As described above, the symmetric encryption key can be encrypted using, for example, the public encryption key of and/or associated with the electronic device owned and/or controlled by the relying entity. Accordingly, the relying entity and/or the electronic device owned or controlled by the relying entity can use its private encryption key to decrypt the encrypted copy of the symmetric encryption key.

In some instances, the server can be configured to send to the relying entity (and/or the electronic device owned and/or controlled by the relying entity) a link, reference, pointer, etc. that the electronic device owned and/or controlled by the relying entity can use to access the encrypted data stored in a memory of the server. For example, in some instances, the link, reference, pointer, etc. can be a hyperlink and/or the like that can direct and/or route the electronic device owned and/or controlled by the relying entity to the storage (memory) location where the encrypted data is stored. In some instances, the server can be implemented to determine whether the one or more consent criterion or criteria are satisfied prior to allowing the electronic device owned and/or controlled by the relying entity to access the encrypted data. For example, in some instances, the server can be implemented to determine whether one or more parameters, characteristics, and/or datasets associated with the relying entity and/or the electronic device owned and/or controlled by the relying entity is in conformance with the license and/or the rules included in or defined by the license. As such, if the consent criterion and/or criteria are satisfied, the server can be implemented to allow the electronic device owned and/or controlled by the relying entity to access the storage location of the server where the encrypted data is stored.

In some instances, the data encrypted using the first encryption key is removed from the memory of the server in accordance with the at least one rule included in and/or defined by the license, at 15. For example, in some instances, the sharing entity via the electronic device owned and/or controlled by the sharing entity can define a predetermined time period during which the relying entity can access the encrypted data (e.g., via the electronic device owned and/or controlled by the relying entity). In such instances, the server can be implemented to delete and/or remove the encrypted data from the memory of the server in response to an expiration and/or ending of the predetermined time period. In other instances, the server can be implemented to delete and/or remove the encrypted data from the memory of the server in accordance with any suitable rule included in and/or defined by the license. In still other instances, the sharing entity can consent to the server storing the encrypted data in the memory of the server until, for example, the sharing entity and/or the electronic device owned and/or controlled by the sharing entity sends a signal to the server indicative of an instruction to delete the data.

While the method 10 of using the system to securely store data and/or to securely share the data with the relying entity is described above, it should be understood that the method 10 is presented by way of example only and not limitation. In some implementations, the method 10 of using the system can include any suitable additional steps and/or processes such as, for example, any of those described herein. Moreover, any of the steps can be performed in one or more parallel or concurrent processes and/or can be performed in any suitable order.

Referring now to FIG. 7, a flowchart is shown illustrating a method 20 of using a system implemented to securely store data and/or securely share the data with a relying entity, according to an embodiment. In some embodiments, the system can be similar to and/or substantially the same as the system 100 described in detail above. As such, the system 100 can include one or more electronic devices (e.g., the first electronic device 110 and the second electronic device 130) and a server (e.g., the server 150) that are in communication via a network (e.g., the network 105).

In some implementations, the server and/or a processor thereof receives from a sharing entity (and/or an electronic device owned and/or controlled by the sharing entity) data that is (1) encrypted using a first encryption key associated with the sharing entity and (2) digitally signed with a digital signature generated using a second encryption key associated with the sharing entity and different from the first encryption key, at 21. For example, in some instances, the sharing entity can be and/or can use or manipulate an electronic device (e.g., the first electronic device 110) to register data with the system. In some instances, the data can be, for example, a document or the like including sensitive data associated with the sharing entity. For example, in some instances, the data and/or document can be and/or can represent identifying information such as, for example, the sharing entity's passport, driver's license, and/or the like. In other instances, the data can be any suitable data in any suitable form or format.

As described above with reference to FIG. 5, in some instances, the registering of the data and/or document with the system can include encrypting the data and digitally signing the data (or the encrypted data). The data can be encrypted using, for example, symmetric-key encryption (e.g., the first encryption key). Accordingly, when the data is registered and encrypted, the electronic device can generate the symmetric encryption key (e.g., the first encryption key), which can be used to encrypt the data to define encrypted data, and to decrypt the encrypted data (e.g., to access the underlying or plaintext data). In some implementations, the data and/or document can be digitally signed using, for example, a private asymmetric encryption key (e.g., the second encryption key) associated with the sharing entity and/or the electronic device owned and/or controlled by the sharing entity. The server and/or the processor thereof can verify that the data was received from the sharing entity based on the digital signature, at 22.

The server and/or the processor thereof receives from the sharing entity (and/or the electronic device owned and/or controlled by the sharing entity) a copy of the first encryption key that is encrypted using a third encryption key associated with the relying entity (and/or an electronic device owned and/or controlled by the relying entity), at 23. The third encryption key is different from the first encryption key and the second encryption key.

For example, the electronic device owned and/or controlled by the sharing entity can be implemented to encrypt the symmetric encryption key (e.g., the first encryption key) using, for example, asymmetric-key encryption (e.g., the third encryption key). As described in detail above, the asymmetric-key encryption can be performed and/or executed by the electronic device using, for example, a public asymmetric encryption key of the relying entity and/or the electronic device owned and/or controlled by the relying entity (e.g., the second electronic device 130). Accordingly, after the electronic device owned and/or controlled by the sharing entity encrypts the symmetric key, the electronic device (e.g., the sharing entity) can be configured to send the encrypted copy of the first encryption key to the server.

The server and/or the processor thereof receives from the sharing entity (and/or the electronic device owned and/or controlled by the sharing entity) a license including data defining at least one rule associated with the relying entity accessing the data using the first encryption key, at 24. For example, the sharing entity can manipulate the electronic device to define a set of rules, parameters, conditions, permissions, and/or levels of consent controlling how the data and/or portions thereof can be shared with the relying entity (and/or the electronic device owned and/or controlled by the relying entity). In some instances, the license can include and/or can define a scope of consent granted by the sharing entity that can control who can access the data (or portions thereof), how the data (or portions thereof) can be accessed, and/or the like. As described in detail above with reference to FIG. 5, the license and/or consent can include rules defining a time during which the relying entity (e.g., via the electronic device owned and/or controlled by the relying entity) may access the data, a geographic location or range in which the relying entity can use the electronic device to access the data, one or more purposes for accessing the data, who within the relying entity can access the data (e.g., when the relying entity is a corporate entity), and/or any other suitable rules or the like. In some instances, the license, rules, and/or consent can be and/or can define one or more consent criterion or criteria, and access to the data by the relying entity (and/or the electronic device owned and/or controlled by the relying entity) can be dependent and/or contingent on the satisfaction of the consent criterion or criteria. Accordingly, after the electronic device owned and/or controlled by the sharing entity defines and/or generates the license, the electronic device can be configured to send the license to the server.

In some instances, the server and/or the processor thereof sends to the relying entity (and/or the electronic device owned and/or controlled by the relying entity) the encrypted copy of the first encryption key such that the relying entity (e.g., via the electronic device owned and/or controlled by the relying entity) can decrypt the encrypted copy of the first encryption key to access the data in accordance with the at least one rule, at 25. In some instances, the relying entity (e.g., via the electronic device owned and/or controlled by the relying entity) can access the data that is stored in a memory or database of the server. For example, the server and/or the processor thereof can be configured to send to the relying entity (and/or the electronic device owned and/or controlled by the relying entity) a link, reference, pointer, etc. that the electronic device owned and/or controlled by the relying entity can use to access the encrypted data stored in the memory or database of the server. In some instances, the link, reference, pointer, etc. can be a hyperlink and/or the like that can direct and/or route the electronic device owned and/or controlled by the relying entity to the storage (memory or database) location where the encrypted data is stored. In some instances, the server and/or the processor thereof can be implemented to determine whether the one or more consent criterion or criteria are satisfied prior to allowing the electronic device owned and/or controlled by the relying entity to access the encrypted data. For example, the server and/or the processor thereof can be implemented to determine whether one or more parameters, characteristics, and/or datasets associated relying entity and/or the electronic device owned and/or controlled by the relying entity is in conformance with the license and/or the rules included in or defined by the license. As such, if the consent criterion and/or criteria are satisfied, the electronic device owned and/or controlled by the relying entity can be allowed to access the storage location of the server where the encrypted data is stored. In other instances, the encrypted copy of the data can be sent to the relying entity along with the encrypted copy of the first encryption key (e.g., via one or more signals, one or more messages, one or more encrypted messages, etc.).

As described above, the symmetric encryption key can be encrypted using, for example, the public asymmetric encryption key of and/or associated with the electronic device owned and/or controlled by the relying entity. Accordingly, the relying entity and/or the electronic device owned or controlled by the relying entity can use its private asymmetric encryption key to decrypt the encrypted copy of the symmetric encryption key. The relying entity and/or the electronic device owned or controlled by the relying entity can then use the decrypted symmetric encryption key to access the data and/or one or more portions of the data in accordance with the rules included in the license.

While the method 20 of using the system to securely store data and/or to securely share the data with the relying entity is described above, it should be understood that the method 20 is presented by way of example only and not limitation. In some implementations, the method 20 of using the system can include any suitable additional steps and/or processes such as, for example, any of those described herein. Moreover, any of the steps can be performed in one or more parallel or concurrent processes and/or can be performed in any suitable order.

Some embodiments described herein relate to a computer storage product with a non-transitory computer-readable medium (also can be referred to as a non-transitory processor-readable medium) having instructions or computer code thereon for performing various computer-implemented operations. The computer-readable medium (or processor-readable medium) is non-transitory in the sense that it does not include transitory propagating signals per se (e.g., a propagating electromagnetic wave carrying information on a transmission medium such as space or a cable). The media and computer code (also can be referred to as code) may be those designed and constructed for the specific purpose or purposes. Examples of non-transitory computer-readable media include, but are not limited to, magnetic storage media such as hard disks, floppy disks, and magnetic tape; optical storage media such as Compact Disc/Digital Video Discs (CD/DVDs), Compact Disc-Read Only Memories (CD-ROMs), and holographic devices; magneto-optical storage media such as optical disks; carrier wave signal processing modules; and hardware devices that are specially configured to store and execute program code, such as Application-Specific Integrated Circuits (ASICs), Programmable Logic Devices (PLDs), Read-Only Memory (ROM) and Random-Access Memory (RAM) devices. Other embodiments described herein relate to a computer program product, which can include, for example, the instructions and/or computer code discussed herein.

Some embodiments and/or methods described herein can be performed by software (executed on hardware), hardware, or a combination thereof. Hardware modules may include, for example, a general-purpose processor, a field programmable gate array (FPGA), and/or an application specific integrated circuit (ASIC). Software modules (executed on hardware) can be expressed in a variety of software languages (e.g., computer code), including C, C++, Java™ Ruby, Visual Basic™, and/or other object-oriented, procedural, or other programming language and development tools. Examples of computer code include, but are not limited to, micro-code or micro-instructions, machine instructions, such as produced by a compiler, code used to produce a web service, and files containing higher-level instructions that are executed by a computer using an interpreter. For example, embodiments may be implemented using imperative programming languages (e.g., C, Fortran, etc.), functional programming languages (Haskell, Erlang, etc.), logical programming languages (e.g., Prolog), object-oriented programming languages (e.g., Java, C++, etc.) or other suitable programming languages and/or development tools. Additional examples of computer code include, but are not limited to, control signals, encrypted code, and compressed code.

While various embodiments have been described above, it should be understood that they have been presented by way of example only, and not limitation. Where schematics and/or embodiments described above indicate certain components arranged in certain orientations or positions, the arrangement of components may be modified. While the embodiments have been particularly shown and described, it will be understood that various changes in form and details may be made. Although various embodiments have been described as having particular features and/or combinations of components, other embodiments are possible having a combination of any features and/or components from any of embodiments described herein.

Where methods and/or events described above indicate certain events and/or procedures occurring in certain order, the ordering of certain events and/or procedures may be modified. Additionally, certain events and/or procedures may be performed concurrently in a parallel process when possible, as well as performed sequentially as described above.

What is claimed:

1. A method, comprising:
receiving, at a server and from a sharing entity, data encrypted using a first encryption key associated with the sharing entity;
receiving, at the server and from the sharing entity, a copy of the first encryption key encrypted using a second encryption key different from the first encryption key, the second encryption key associated with a relying entity;
receiving, at the server and from the sharing entity, a license including data defining at least one rule associated with the relying entity accessing, using the first encryption key, the data encrypted using the first encryption key that is stored on the server;
sending, from the server and to the relying entity, the copy of the first encryption key such that the relying entity can decrypt the copy of the first encryption key to access, in accordance with the at least one rule, the data encrypted using the first encryption key that is stored on the server; and
removing the data encrypted using the first encryption key from a memory of the server in accordance with the at least one rule of the license.

2. The method of claim 1, wherein the at least one rule is associated with at least one of a predetermined time during which the relying entity is granted access to the data, a predetermined geographic area in which the relying entity is granted access to the data, a predetermined list of individuals permitted to access the data, or at least one security protocol governing a mode that the relying entity uses to access the data.

3. The method of claim 1, wherein the second encryption key is a public asymmetric encryption key associated with the relying entity, the relying entity stores in a memory of the relying entity a private asymmetric encryption key configured to decrypt data encrypted using the public asymmetric encryption key associated with the relying entity.

4. The method of claim 1, wherein the first encryption key is a symmetric encryption key and the second encryption key is a public asymmetric encryption key associated with the relying entity.

5. The method of claim 1, wherein the data encrypted using the first encryption key is signed with a digital signature associated with the sharing entity, the digital signature being defined by the sharing entity using a third encryption key different from the first encryption key and the second encryption key, the digital signature configured to allow the server to verify that the data encrypted using the first encryption key was received from the sharing entity.

6. The method of claim 1, wherein the data encrypted using the first encryption key is signed with a first digital signature associated with the sharing entity and a second digital signature associated with a verifying entity, the first digital signature configured to allow the server to verify that the data encrypted using the first encryption key was received from the sharing entity, the second digital signature being indicative of the verifying entity attesting to the authenticity of the data encrypted using the first encryption key.

7. The method of claim 1, wherein the data is signed with a first digital signature prior to the data being encrypted using the first encryption key and the data is signed with a second digital signature after being encrypted using the first encryption key, the first digital signature is associated with a verifying entity and is indicative of the verifying entity attesting to the authenticity of the data, the second digital signature is associated with the sharing entity and is configured to allow the server to verify that the data encrypted using the first encryption key was received from the sharing entity.

8. A non-transitory processor readable medium storing code representing instructions to be executed by a processor, the code comprising code to cause the processor to:

receive, from a sharing entity, data (1) encrypted using a first encryption key associated with the sharing entity and (2) signed with a digital signature generated using a second encryption key associated with the sharing entity, the second encryption key being different from the first encryption key;

verify the data was received from the sharing entity based on the digital signature;

receive, from the sharing entity, a copy of the first encryption key encrypted using a third encryption key different from the first encryption key and the second encryption key, the third encryption key associated with a relying entity;

receive, from the sharing entity, a license including data defining at least one rule associated with the relying entity accessing the data using the first encryption key; and send, to the relying entity, the copy of the first encryption key such that the relying entity can decrypt the copy of the first encryption key to access the data in accordance with the at least one rule.

9. The non-transitory processor-readable medium of claim 8, wherein the code to cause the processor to receive the data includes code to cause the processor to at least temporarily store the data in a database, the code further comprising code to cause the processor to:

remove the data from the database at a predetermined time after the data is stored in the database in accordance with the at least one rule of the license.

10. The non-transitory processor-readable medium of claim 8, wherein the at least one rule is associated with at least one of a predetermined time during which the relying entity is granted access to the data, a predetermined geographic area in which the relying entity is granted access to the data, a predetermined list of individuals permitted to access the data, or at least one security protocol governing the mode that the relying entity uses to access the data.

11. The non-transitory processor-readable medium of claim 8, wherein the second encryption key is a private asymmetric encryption key associated with the sharing entity, the code to cause the processor to verify the data was received from the sharing entity includes code to cause the processor to verify the digital signature using a public asymmetric encryption key associated with the sharing entity.

12. The non-transitory processor-readable medium of claim 8, wherein the third encryption key is a public asymmetric encryption key associated with the relying entity, the relying entity storing in a memory of the relying entity a private asymmetric encryption key configured to decrypt data encrypted using the public asymmetric encryption key associated with the relying entity.

13. The non-transitory processor-readable medium of claim 8, wherein the first encryption key is a symmetric encryption key associated with the sharing entity, the second encryption key is a private asymmetric encryption key associated with the sharing entity, and the third encryption key is a public asymmetric encryption key associated with the relying entity.

14. The non-transitory processor-readable medium of claim 8, wherein the digital signature is a first digital signature, the data is signed with a second digital signature prior to being encrypted using the first encryption key, the second digital signature is associated with a verifying entity and is configured to allow the relying entity to confirm that the verifying entity attests to the authenticity of at least a portion of the data.

15. The non-transitory processor-readable medium of claim 8, wherein the relying entity is a relying entity from a plurality of relying entities, the copy of the first encryption key is a copy of the first encryption key from a plurality of copies of the first encryption key, and the license is a license from a plurality of licenses, each copy of the first encryption key from the plurality of copies of the first encryption key is encrypted using a public asymmetric encryption key associated with a different relying entity from the plurality of relying entities, and each license from the plurality of licenses (1) is associated with a different copy of the first encryption key from the plurality of copies of the first encryption keys and (2) includes at least one rule associated with the associated relying entity from the plurality of relying entities using the associated copy of the first encryption key to access the data.

16. The non-transitory processor-readable medium of claim 8, wherein the data is normalized into a standard format prior to being encrypted using the first encryption key.

17. An apparatus, comprising:

a memory; and a processor operatively coupled to the memory, the processor configured to:

store in the memory a message received from a sharing entity, the message including (1) data encrypted using a first encryption key associated with the sharing entity, (2) a copy of the first encryption key encrypted using a second encryption key different from the first encryption key and associated with a relying entity, and (3) a license including data indicative of at least one rule associated with the sharing entity consenting to the relying entity using the first encryption key to access the data, the message being signed by the sharing entity using a digital signature generated via a third encryption key different from the first encryption key and the second encryption key, verify the message was received from the sharing entity based on the digital signature, and send to the relying entity the copy of the first encryption key such that the relying entity is allowed to access the data, stored in the memory, using the first encryption key and in accordance with the at least one rule.

18. The apparatus of claim 17, wherein the first encryption key is a symmetric encryption key associated with the sharing entity, the second encryption key is a private asymmetric encryption key associated with the sharing entity, and the third encryption key is a public asymmetric encryption key associated with the relying entity.

19. The apparatus of claim 17, wherein the at least one rule is associated with at least one of a predetermined time during which the relying entity is granted access to the data stored in the memory, a predetermined geographic area in which the relying entity is granted access to the data stored in the memory, a predetermined list of individuals permitted to access the data stored in the memory, or at least one security protocol governing the mode that the relying entity uses to access the data stored in the memory.

20. The apparatus of claim 17, wherein the digital signature is a first digital signature, the data is signed with a second digital signature prior to being encrypted using the first encryption key, the second digital signature is associated with a verifying entity and is indicative of the verifying entity attesting to the authenticity of at least a portion of the data.

21. The apparatus of claim 17, wherein the digital signature is a first digital signature, a first portion of the data is signed with a second digital signature and a second portion of the data is signed with a third digital signature prior to being encrypted using the first encryption key, the second digital signature is associated with a first verifying entity and is indicative of the first verifying entity attesting to the authenticity of the first portion of the data, the third digital signature is associated with a second verifying entity and is indicative of the second verifying entity attesting to the authenticity of the second portion of the data different from the first portion of the data.

22. The apparatus of claim 17, wherein at least the first encryption key and the second encryption key are generated using cryptographic functions included in a native application executed by the sharing entity.

* * * * *